US006385595B1

(12) United States Patent
Kolling et al.

(10) Patent No.: US 6,385,595 B1
(45) Date of Patent: *May 7, 2002

(54) ELECTRONIC STATEMENT PRESENTMENT SYSTEM

(75) Inventors: Ray Kolling, Menlo Park; Michael Occhino, Castro Valley; Jeffrey D. Roughgarden, Redwood City, all of CA (US); James T. Hayward, Shawnigan Lake (CA)

(73) Assignee: Visa International Service Association, Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/344,829

(22) Filed: Jun. 25, 1999

Related U.S. Application Data

(63) Continuation of application No. 08/947,629, filed on Oct. 8, 1997, now Pat. No. 5,963,925.

(60) Provisional application No. 60/028,095, filed on Oct. 9, 1996.

(51) Int. Cl.[7] .......... G06F 17/60

(52) U.S. Cl. .......... 705/40; 705/34

(58) Field of Search .......... 705/30, 34, 35, 705/39, 40, 42, 44, 45

(56) References Cited

U.S. PATENT DOCUMENTS 4,634,845 A 1/1987 Hale et al.
4,689,478 A 8/1987 Hale et al.
4,713,761 A 12/1987 Sharpe et al.
4,713,837 A 12/1987 Gordon
4,799,156 A 1/1989 Shavit et al.
4,823,264 A 4/1989 Deming
4,949,272 A 8/1990 Vanourek et al.

(List continued on next page.)

FOREIGN PATENT DOCUMENTS

JP 0745947 A2 * 4/1996

OTHER PUBLICATIONS

Epper "Checkfree to test on–line payment with utility companies in 3 states"; Oct. 1995, American Banker, v160, n218, p14(1), Dialog file 148, Accession No. 08297809.*
Michelle; "US order's stock price up sharply rise linked to news of internet product"; Wahington Post; Dialog file 146, Accession No. 4044098, Dec. 1995.*
Shapiro; "Getting, staying in contact which disclose enclosure and a plurality of templates"; MacWeek, v4, N33, p59(5); Dialog file 148, Accession No. 04810289, Oct. 1990.*

(List continued on next page.)

*Primary Examiner*—Kyle J. Choi
*Assistant Examiner*—Romain Jeanty
(74) *Attorney, Agent, or Firm*—Beyer Weaver & Thomas, LLP

(57) ABSTRACT

An electronic statement presentment (ESP) system replaces the preparation and mailing of paper statements and invoices from a biller with electronic delivery. Electronic statements have the same look as paper statements as well as including video, audio, graphics, and custom enclosures. Statements are segmented into mandatory and optional components to minimize download time. The ESP system operates independently or is an enhancement to any suitable electronic bill payment system. A central switch computer coordinates template storage, validation, routing and message passing between billers, workstations and consumer financial institutions (CFI). A template authoring workstation (TAWS) creates a template of static biller information to serve as a basis for the electronic statement. The template is stored in a template library at the switch. The switch validates the template by sending it to a template validation workstation (TVAL). Batches of customer statement data are sent from a biller's legacy invoicing system to a statement origination workstation (SORG) along with a template identifier.

21 Claims, 19 Drawing Sheets

U.S. PATENT DOCUMENTS

| | | | | |
|---|---|---|---|---|
| 4,988,849 A | | 1/1991 | Sasaki et al. | |
| 5,007,084 A | | 4/1991 | Materna et al. | |
| 5,025,373 A | | 6/1991 | Keyser, Jr. et al. | |
| 5,193,055 A | | 3/1993 | Brown et al. | |
| 5,193,110 A | | 3/1993 | Jones et al. | |
| 5,220,501 A | | 6/1993 | Lawlor et al. | |
| 5,237,159 A | | 8/1993 | Stephens et al. | |
| 5,262,942 A | | 11/1993 | Earle | |
| 5,265,033 A | | 11/1993 | Vajk et al. | |
| 5,283,829 A | | 2/1994 | Anderson | |
| 5,287,270 A | | 2/1994 | Hardy et al. | |
| 5,325,290 A | | 6/1994 | Cauffman et al. | |
| 5,336,870 A | | 8/1994 | Hughes et al. | |
| 5,367,561 A | | 11/1994 | Adler et al. | |
| 5,373,561 A | | 12/1994 | Haber et al. | |
| 5,383,113 A | | 1/1995 | Kight et al. | |
| 5,410,598 A | | 4/1995 | Shear | |
| 5,420,405 A | | 5/1995 | Chasek | |
| 5,426,594 A | | 6/1995 | Wright et al. | |
| 5,453,601 A | | 9/1995 | Rosen | |
| 5,455,407 A | | 10/1995 | Rosen | |
| 5,465,206 A | | 11/1995 | Hilt et al. | |
| 5,473,143 A | | 12/1995 | Vak et al. | |
| 5,483,445 A | | 1/1996 | Pickering | |
| 5,484,988 A | | 1/1996 | Hills et al. | |
| 5,485,370 A | | 1/1996 | Moss et al. | |
| 5,496,991 A | | 3/1996 | Delfer, III et al. | |
| 5,508,817 A | | 4/1996 | Kunigami | |
| 5,517,569 A | | 5/1996 | Clark | |
| 5,532,464 A | | 7/1996 | Josephson et al. | |
| 5,557,518 A | | 9/1996 | Rosen | |
| 5,699,528 A | * | 12/1997 | Hogan | 705/40 |
| 5,761,650 A | * | 6/1998 | Munsil | 705/34 |
| 5,832,460 A | | 11/1998 | Bednar et al. | 705/27 |

OTHER PUBLICATIONS

"New product enables merchants to present bills on internet"; PR News, p1204DCM016; Dialog file 16, Accession No. 04105573, Dec. 1995.*

Cary; "Document assembly using WordPerfect and word", Jul. 1994; Information Today v11n7 pp. 10–11; Proquest file 00907550.*

Jim; "Electronic Billing Via Internet" Dec. 21, 1995; Newsbytes News Network, Stillwater.*

"Online Fund System Among Main Banks", Oct. 1989, Money Circulation System.

"Money circulation Data System Center", Electronic Banking, Oct. 31, 1986, pp. 35–41.

D.W. Davies and W.W. Price, translated by Tadahiro Ueno, "Electronic Money Movement and Intelligent Token", Dec. 5, 1985, Network Security, Chapter 10, pp. 251–263 and pp. 283–287.

"Notice of the Reason for Refusal", Mar. 31, 1998, Japanese Patent Office.

Dr. Denis Manelski, Bill & Pay Minitel, presented on Apr. 22, 1992.

Announcement released on Mar. 20, 1995, on web site http://ganges.cs.tcd.ie/mpeirce/Project/Press/fboi.html.

David Chaum, World's finest electronic cash payment over computer networks, May 27, 1994, on web site http://ganges.cs.tcd.ie/mepeirce/Project/press/ec_press.html.

Eric Mankin, the Check is in the E–Mail (And, Coming Soon, Electronic Greenbacks), Nov. 7, 1994, USC Chronicle.

Presented by Dennis J. Pope of Manufacturing Hanover Trust Company.

Presented by Paul J. Mila of Online Resources and Communications Corp.

Chris Shipley, I three away my checkbook, Nov. 1990, PC Computing.

George C. White, Have you heard? "Check and list" is obsolete for receiving consumer bill payments. Sep./Oct. 1990, Journal of Cash Management.

"International Search Report", Mar. 23, 1998, European Patent Office, 3 pages.

Tanja Lian, "Apply Your Marketing Talent to promote On–line Banking", May 1, 1996, Bank Marketing, pp. 25–30.

Sirbu, et al., "NetBill: An Internet Commerce System Optimized for Network Delivered Services", Mar. 1995, IEEE.

David Jones, "US Banks Experiment with Home Banking", Jan. 1984, The Banker.

Debbie Gunthrie Haer, "Two–way Cable TV to provide Home Banking in Omaha", Feb. 15, 1982, Bank News.

Garrett P. Bromley, "At the Podium A Bankers View: Prescribing Financial Relief for New Doctors", Sep. 1982, United States Banker.

Michael P. Sullivan, "Financial Forum: the HBI Role in the Home Banking Revolution", United States Banker.

Joan Prevete Hyman, "Spotlight on software—Switch Software to Take on POS, Home Banking Functions: These packages Will be Able to Handle More Than Just ATM messages, Say Vendors", Feb. 1983, Bank Systems & Equipement.

Lisa Fickenscher, "Credit/Debit/ATMs: Online Resources' Home Banking Patent Hits Hot Buttons Throughout Industry", Feb. 17, 1994, American Banker.

"Finance, Next in Banking": Pay Bills by Phone.

Robert M. Garsson, "NBD Offers Electronic Highway for Network of Shared ATMs", Operations, Technology.

"Special Report: Money Goes Electronic in the 1970's", Jan. 13, 1968, Business Week.

John P. Fisher, "In–Home Banking Today and Tomorrow", Jun. 1982, Journal of Retail Banking, vol. IV, No. 2.

Robert Trigaux, "Home Banking reaches Critical Juncture: Principal providers May Already Be in Place; Small–Bank Options Emerge", Oct. 19, 1982, American Banker, vol. 147, Issue 204.

Jerry Adams, "Home Banking Interchange offers More than just Credits and Debits", Jul. 6, 1983, American Banker, vol. 148, Issue 130.

"Home Banking Interchange: New Venture to Test Home Banking Acceptance", May 27, 1983, Revolving Credit & Electronic Systems Letter.

Michael P. Sullivan, "Home–Banking: The Ultimate Delivery System", The Bankers Magazine.

John A. Farnsworth, Technology Report: Home Banking—Parts of a Bigger Picture, Jun. 1983, United States Banker.

"Electronic Home Banking Lets Customers Pay bills Around the Clock", Apr. 1984, The Magazine of Bank Administration.

Tekla S. Perry, "Electronic Banking Goes to market", Feb. 1998, IEEE Spectrum.

Edward J. Hogan, "EFT Technology—Present and Future", Dec. 16, 1976, National Commission of Electronic Fund Transfer, Suppliers Committee Public Hearing (2 Volumes).

Maria Osborn Howard, "Crestar to Test At–Home Banking", Feb. 26, 1994, Richmond Times–Dispatch.

David O. Tyson, "Banks in Denver, San Francisco to Offer Customers PC Links", Oct. 23, 1985.

Anderson et al., "An Electronic Cash and Credit System", 1966, American Management Association.
"Base I: A Real–Time System for Interchange Authorizations", VISA U.S.A, Inc.
"Base II: An Electronic System for Worldwide Interchange", VISA U.S.A., Inc.
Lynch, et al., "Digital Money, The New Era of Internet Commerce", 1996, John Wiley & Sons, Inc.
Tekla S. Perry, "Electronic Money: Toward a Virtual Wallet", IEEE Spectrum, Feb. 1997.
Edward W. Kelley, Jr., "The Future of Electronic Money: A Regulator's Perspective", IEEE Spectrum, Feb. 1997.
Marvin A. Sirbu, "Credit and Debits on the Internet", IEEE Spectrum Feb. 1997.
David Chaum, et al., "Minting Electronic Cash", IEEE Spectrum Feb. 1997.
Peter S. Gemmell, "Traceable E–Cash", IEEE Spectrum Feb. 1997.
Stanley E. Morris, "Crime and Prevention: A Treasury Viewpoint", IEEE Spectrum Feb. 1997.
Baldwin et al., "Locking the E–Safe", IEEE Spectrum Feb. 1997.
Carol Hovenga Fancher, "In Your Pocket: Smartcards", IEEE Spectrum Feb. 1997.
Michael C. McChesney, "Banking in Cyberspace: An Investment in Itself", IEEE Spectrum 1997.
Steven M.H. Wallman, "Technology Takes to Securities Trading", IEEE Spectrum 1997.
Alfred R. Berkeley, III, "Nasdaq's Technology Floor: Its President Takes Stock", IEEE Spectrum 1997.
Mike TerMaat, "The Economics of E–Cash", IEEE Spectrum 1997.
Howard Anderson, "Money and the Internet: A Strange New Relationship" IEEE Spectrum 1997.
"To Probe Further", IEEE Spectrum 1997.
CyberCash's Secure Internet Payment Services, CyberCash, Inc., Reston, Virginia 22091.
Leslie Marable, "A test Moves net–Based Bill Payment a Step Closer", WebWeek, vol. three, Issue Three, Feb. 3, 1997.
"Visa ePay: A Fully Electronic Solution for Biller Payment Delivery", Visa U.S.A Inc. V4068–06–86, 1996.

* cited by examiner

Electronic Statement Presentment (ESP) System

Master Universal Biller File (UBF)

300

```
                    COMMONSTATE ELECTRIC COMPANY
                                                    — 841
Customer Account No. 123-456-789
                   ┌843              ┌842
John R. Public                              New Charges:   $46.64   ┌844
1234 Street Drive                           Prev. Bill:    $43.21
City, State ZipCode                         Payment:       $43.21
                                            Amount Due:    $46.64
Electricity Used:                           Billing Date:  Feb. 28, 1999
                                            Due-Date:      Mar. 12, 1999
    Feb. 24 reading:   43210
    Jan. 24 reading:   42786                Send payment to:
    30-Day Billed Used: 00424
845  Current Charges:                       Commonstate Electric Company
                                            543 Main Street
        424 x $0.11 = $46.64                Big City, State ZipCode  �ణ846
                            847                                          ┌850
    ┌──────────────────────┐                ┌──────────────────────────┐
    │ ☐ This year          │                │ Special Offer for Commonstate
    │ ▨ Last year          │                │ Electric Customers!
    │    ▮▮▮▮▮▮▮▮▮▮▮▮      │                │ Comlete Spring Car Tune-Up from
    │    M A M J J A S O N D J F │          │         CAR MASTERS
    │   Twelve Month Electricity Use │      │ Reg. $99, Now $59
    └──────────────────────┘                │    Call 1-800-TUNEUPS
                          848               └──────────────────────────┘
    ┌──────────────────────┐                ┌──────────────────────────┐
    │ Cut your electricity use up to 25%!   │ Got the Winter Blues?
    │ Call your Commonstate customer        │
    │ service representative for details.   │ Win a Hawaii Vacation for
    │    Call 1-800-ELECTRC                 │ Two! Call 1-800-NOBLUES
    └──────────────────────┘                └──────────────────────────┘
                         849                                        851
```

Example Electronic Statement

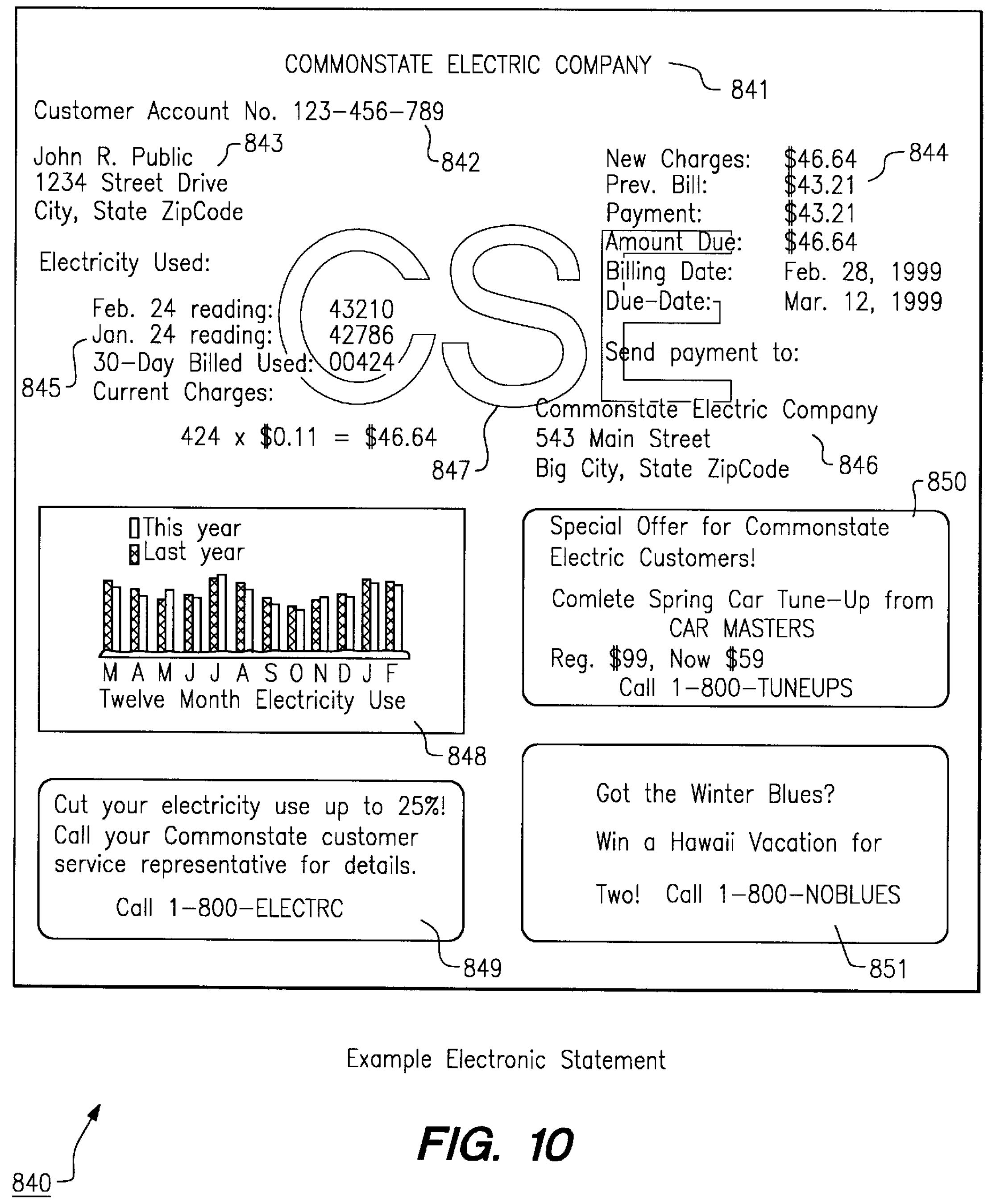

Sample Electronic Banking Service Welcome Screen Shot

Sample List of Invoices Available on Server

Sample Invoice Summary Screen Shot

Sample Invoice Detail Screen Shot

Sample Optional Enclosure Screen Shot

Sample Make Payment Screen Shot

ELECTRONIC STATEMENT PRESENTMENT SYSTEM

This application is a continuation of U.S. patent application No. 08/947,629, filed Oct. 8, 1997 now U.S. Pat. No. 5,963,925, which in turn claims priority of U.S. provisional patent application No. 60/028,095, filed Oct. 9, 1996, entitled "Electronic Statement Presentation", by inventors Kolling, et al., which is hereby incorporated by reference in its entirety for all purposes.

FIELD OF THE INVENTION

The present invention relates generally to electronic financial transactions. More specifically, the present invention relates to an electronic statement presentment system that allows a biller to direct a statement or invoice electronically to a consumer.

BACKGROUND OF THE INVENTION

Millions of consumer make monthly payments to utilities, merchants, banks, and other service providers ("billers") by check, with a small number of consumers using electronic banking services. The term "consumer" as used herein broadly refers to any person or entity paying a bill, be it a utility customer, a taxpayer paying a tax, a borrower repaying a loan, a state or government paying a bill, a person receiving a statement of account from a bank, brokerage firm, etc.

Billers, who often are billing small amounts with each transaction, incur the costs of processing many checks and the attendant overhead of dealing with paper remittance coupons and envelopes. Given the economy of scale, a biller has great incentive to reduce the cost of remittance processing, and an even larger incentive to reduce the cost of "exception items." An exception item is a payment that, for some reason, cannot be processed according to the highly automated procedures put in place by the biller to quickly process the remittances. Exception items include checks received without payment coupons, payment coupons received without checks, checks for amounts different than the amount shown on the coupon, multiple payments received in an envelope with a single check, etc. Whereas the cost to a biller to process a properly submitted remittance may be $0.10 per item, an exception item transaction might cost as much as $0.65 to $1.50. Billers, therefore, have a large incentive to minimize the number of exception items.

Various prior art electronic bill payment services exist (including electronic banking, bill payment service bureaus, banks, etc.), but generally increase the cost per item to the biller as well. These prior art electronic bill payment services include services offered by Bank of America, Wells Fargo, CheckFree, and through software products such as MS Money and Quicken. Unfortunately, when a consumer decides to try an alternate form of remittance using these electronic bill payment services the cost to the biller increases dramatically because such a remittance is typically an exception item to most billers today. A bill payment service provider offers a bill payment services to consumers whereby the consumer directs the service provider to make payments to the biller. Since the payment origination is usually done electronically, the remittance is not presented to the biller in the usual way with a check and a payment coupon in the biller provided envelope. Instead, the biller usually receives a check printed by the service bureau showing the consumer's account number and other data. In some cases, the biller is presented with a check along with instructions to credit the amount of the check to the consumer's account. In other cases, the payment is an electronic transfer where the consumer's account information is included in a list of payments from multiple consumers.

In any case, these transactions are exception items to the biller since no payment coupon is presented, thus entailing additional costs to billers. Furthermore, large bill payment service bureaus may have many consumers using their service and paying bills to the same biller. Unfortunately, that biller will often receive one check for many customers accompanied by a list of account numbers and amounts for consumers whose remittances are part of the single check. The biller must then go through the list manually to verify the account numbers are correct, and then capture the data to its accounting system. Furthermore, a biller with thousands of customers may have to deal with a large number of electronic bill payment services (that is, many service bureaus or banks) directly. The logistics of dealing with many different electronic bill payment services and keeping track of consumers, their account numbers, and with which electronic bill payment service they are associated, increases the cost of processing remittances by the biller.

One technique for addressing the above inefficiencies in bill payment is shown in FIG. 1. FIG. 1 illustrates an electronic bill payment environment 10. Environment 10 allows a consumer 12 to easily pay a bill via electronic means to any of a number of billers 14. Operating regulations 16, contractual arrangements, or rules, govern the actions of the parties within the overall environment, and an electronic payment system 18 performs the actual transfer of an electronic bill from a consumer financial institution 20 to a biller financial institution 22. Once consumer 12 receives a bill in the mail, the consumer interacts with financial institution 20 to direct that the bill payment be sent to biller 14. Electronic payment system 18 manages the transfer of the electronic payment from consumer financial institution 20 to biller financial institution 22. Electronic payment system 18 may take a variety of forms for transferring electronic payments. By way of example, a suitable electronic bill payment system 18 is disclosed in U.S. Pat. No. 5,465,206 entitled "Electronic Bill Pay System", commonly owned by the assignee of the present application, which issued on Nov. 7, 1995 to Hilt, et al. This patent is hereby incorporated by reference in its entirety. Although an electronic bill payment environment 10 including an electronic payment system 18 may be implemented in a variety of ways and managed by any entity, FIG. 1 provides an example of such an environment 10 that is coordinated by Visa International Service Association (hereinafter "VISA") of San Mateo, Calif. In one specific embodiment, electronic bill payment system 18 is the Visa ePay system.

Electronic payment system 18 includes technical platform 24 (hardware and software for implementation), biller reference file 26 (such as a universal biller file, or UBF, of U.S. Pat. No. 5,465,206), and service infrastructure 28. In the Visa ePay system embodiment, a global clearing and settlement system termed VisaNet is used to assist in administration of electronic payment environment 10. Through use of electronic payment environment 10, consumer 12 is able to quickly and easily send payment and accounts receivable information 30 to biller 14 in a manner that reduces the costs associated with handling these payments to biller 14.

Such an electronic payment system 18 provides a variety of advantages. It is an interbank system that facilitates information exchange between banks and adds value to that exchange. It allows a financial institution on either end to maintain relationships with consumers and/or billers and to provide branded services to those consumers and/or billers. That is, the internal operation of electronic payment system 18 and the presence of its coordinating entity are invisible to consumers and billers. It allows a biller to deal with a single financial institution and minimizes exception items because the electronic bill payments come with consumer authorized payment instructions that are not viewed as exception items. Such an electronic payment system has advantages for financial institutions as well such as supporting electronic payment initiatives, providing standards and operating regulations, providing robust and error-free electronic data, and increasing value to the financial institution's customers.

However, even though a biller is provided with an electronic means to receive payments from consumers, there still exists the problem of delivering statements and invoices efficiently to consumers. It is important for a biller to deliver an invoice to a consumer so that the consumer may then pay the bill presented in the invoice. An invoice is typically a bill presented to a consumer for services rendered or service units accumulated. A statement might be delivered to a consumer to update the account status for that consumer, and includes bank accounts, brokerage accounts, etc. The term "statement". will be used broadly herein to denote not only invoices and statements of any form, but other information product that a biller, merchant or other entity desires to deliver to a consumer to update the consumer as to the relationship between biller and consumer.

Currently, invoices in particular are received by consumers through the mail. The cost to a biller in preparing and mailing an invoice to a consumer is a large per unit cost. These costs include the paper for the invoice, any enclosures, the envelope, postage, printing, data management, etc. Similarly, the costs associated with preparing and mailing any type of statement to a consumer can also be quite high. Billers have a large incentive to try to reduce this high cost of mailing statements and invoices. Furthermore, receipt of a paper invoice in the mail does not necessarily encourage a consumer to reply using an electronic bill payment system such as described above. Billers would prefer that a consumer use an electronic bill payment system to pay an invoice to save the biller money.

Other alternative techniques exist for providing invoices to consumers, but suffer from drawbacks. For example, CheckFree provides a service by which a consumer receives an electronic invoice from CheckFree over the Internet. Using the Internet, the consumer must log into the CheckFree Internet site in order to access the consumer's invoice and direct that it be paid. However, this technique requires that CheckFree establish a relationship with each biller that it supports, and also with all of the consumers for that biller. From the biller's perspective, this is not an extremely desirable situation. For one, it is unlikely that every single one of the biller's customers will sign up with CheckFree. Unfortunately, the biller must establish and maintain a relationship with each of these electronic invoice services. Thus, the invoices that a biller sends out must be sent to a variety of independent services for later distribution to the biller's customers. Such a spread out relationship among service providers is difficult and costly for a biller to maintain. Also, as each service may be a separate, independent company, there are no overarching operating regulations to bind all of the parties and to ensure that the biller will receive consistent, quality services. In addition, current electronic invoice services (such as CheckFree) do not allow generation of EDI 810 electronic invoices as required by such organizations as the U.S. Government's General Services Administration (GSA).

Therefore, the above shortcomings of current statement and invoice delivery approaches demonstrate that an improved means of delivering statements and invoices to consumers is needed. Such an improved delivery means would leverage existing systems (such as existing electronic payment bill systems and clearing and settlement systems), and would provide standards and regulations to ensure consistent and quality service.

SUMMARY OF THE INVENTION

To achieve the foregoing, and in accordance with the purpose of the present invention, an electronic statement presentment system is disclosed that allows billers and other entities to efficiently and cost effectively deliver electronic statements to respective consumers of their services and products.

The present invention replaces the printing, stuffing and mailing of paper statements with the power and efficiency of electronic delivery. Billers are provided with the capability to create statements with custom, personalized marketing messages based upon their customer's characteristics. Statements may have the same "look and feel" as paper statements, as well as extended capabilities to include: full motion video; audio; graphics; and custom enclosures based on customer demographic or usage profiles. Statements are segmented into mandatory and optional components to minimize download time and thereby enhance the consumer experience. Electronic statement presentment provides for security and privacy of the information by transporting and delivering statements through a secure network.

Although the present invention may operate stand-alone, in one embodiment of the invention the electronic statement presentment (ESP) system is an enhancement, or is complimentary to any suitable electronic bill payment system. In one specific embodiment, the ESP system is an enhancement to the electronic bill payment system described in U.S. Pat. No. 5,465,206, and in particular may be integrated with VISA's ePay system to provide full-circle electronic financial transactions for billers and consumers. By introducing electronic statement presentment to an existing electronic bill payment system, an added dimension enables fully automated bill payment. In addition, any suitable electronic remote banking service provided by a financial institution is also enhanced. By integrating the ESP system of the present invention into an electronic bill payment system, a fully electronic payment system is provided that enables processing controls, transaction completion certainty and item resolution. These features are not possible in the traditional paper-based process that uses either the post office or a courier to deliver paper statements.

The present invention provides a variety of other advantages. For one, electronic statement presentment reduces the mailing costs for billers on a per unit cost. By delivering statements electronically and automatically, the costs associated with preparation and mailing of a paper statement are greatly reduced. Also, by presenting an electronic statement to a consumer, the chances are greatly increased that the same consumer will take advantage of an associated electronic bill payment system, thus further reducing costs to the biller. Furthermore, the present invention is able to send electronically a variety of statement and invoice types (or other information products) from a business entity to a consumer.

In one embodiment of the invention, an electronic statement originates from a biller or biller service provider (BSP) and is transmitted to a consumer financial institution (such as a bank) or a consumer service provider (CSP). Delivery of the electronic statement to such a bank and not directly to a consumer allows the bank to maintain its established relationship with that consumer and provides a simpler solution for billers who do not need to deal directly with a variety of electronic service bureaus. By offering a single, comprehensive electronic statement presentment system able to route statements from billers to any consumer financial institution for delivery to any customer of that biller frees a biller from the difficulties associated with establishing relationships with a multitude of service providers. Unlike the prior art, where customers might choose any of a multitude of service providers, thus forcing billers to establish relationships with this multitude of service providers, the present invention allows a biller to enroll in a single ESP system and be assured that electronic statements will be delivered to those of its customers that desire electronic statements, regardless of the customer's choice of financial institution.

A bank or other consumer service provider may also integrate such an electronic statement delivery from a biller into its own electronic home banking product in order to enhance that product and to provide more value to its consumer. In this fashion, a consumer may continue a relationship with his current bank, yet still be able to receive electronic statements from any biller from which the consumer receives a service. Alternatively, a consumer may choose any consumer service provider it desires that might provide electronic statements by way of the present invention. Thus, the present invention enhances the value of the consumer financial institution or consumer service provider in the eyes of the consumer.

The present invention is able to receive all electronic statements from a particular biller during a given billing cycle (for those customers that wish electronic statements) and then distribute those electronic statements to the appropriate consumer financial institutions for later delivery to the customers. Customers of a particular biller may use a variety of consumer financial institutions. Routing of the statements to the correct institution for eventual delivery to the customer is performed by the electronic statement presentment system. The task of contacting the consumer and providing the electronic statement in an appropriate medium is left to the consumer financial institution.

The consumer financial institution may then use any of a variety of means to transmit this electronic statement to the consumer. For example, any electronic home banking service that the consumer financial institution supports may be used to transmit the electronic statement to the consumer. Electronic means such as the Internet, telephones, video telephones, televisions, WebTV, personal digital assistants, or any other proprietary communication system may be used. For example, banks such as Bank of America and Citibank have their own proprietary systems for communicating with consumers. The consumer financial institution could even print and deliver the statements if it wished. By allowing a consumer financial institution to use its desired means of communication with a customer, and by integrating the ESP system into this desired means of communication, provides value to the consumer financial institution and to the consumer.

Furthermore, the present invention need not rely upon the Internet which may at times be slow, unreliable or less secure. Any electronic network may be used by the present invention to deliver statement information from a biller to provide an electronic statement to a consumer financial institution. In one embodiment, a private telecommunications EP-based intranet serves as a link to consumer financial institutions, such as a bank that provides electronic banking services for its customers.

Advantageously, the present invention may use any of a variety of data formats for transmitting an electronic statement. As one specific example, use of an Adobe PDF format has been shown to have desirable results. Furthermore, a template used to generate an electronic statement may contain any information, format or logo that the biller desires to send to the consumer. This allows a biller to continue using a similar format and style such as is presented on paper statements to maintain the same "look and feel" for the consumer. The present invention also makes a distinction between static information of a statement (such as biller information, logo, format information, etc.) and dynamic information that must be updated with each electronic statement for each customer (such as number of units used by a customer, amount of the invoice, changes in account status, change in consumer address, date, account history, etc.). In one specific embodiment, the static information is stored in the template, while the dynamic information is transmitted separately from the biller and combined later to generate the complete electronic statement or invoice. As the static information provides the bulk of the template, the present invention allows for the bulk of this information to be moved infrequently to lower telecommunications costs and to only transmit the dynamic information when a statement is being sent for a particular customer.

Thus, an electronic statement presentment system according to the present invention is not only able to operate independently and to provide value to billers, banks and consumers, but is also able to complete the circle for full electronic bill payments and presentments when used in conjunction with an electronic bill payment system. Electronic statement presentment systems implemented according to the invention provide convenience and cost savings to both billers and consumers as well as providing security and reliability.

BRIEF DESCRIPTION OF THE DRAWINGS

The invention, together with further advantages thereof, may best be understood by reference to the following description taken in conjunction with the accompanying drawings in which:

FIG. 10 illustrates an example of a detailed electronic statement according to one embodiment of the present invention.

DETAILED DESCRIPTION OF THE INVENTION OVERVIEW

Figure 1:
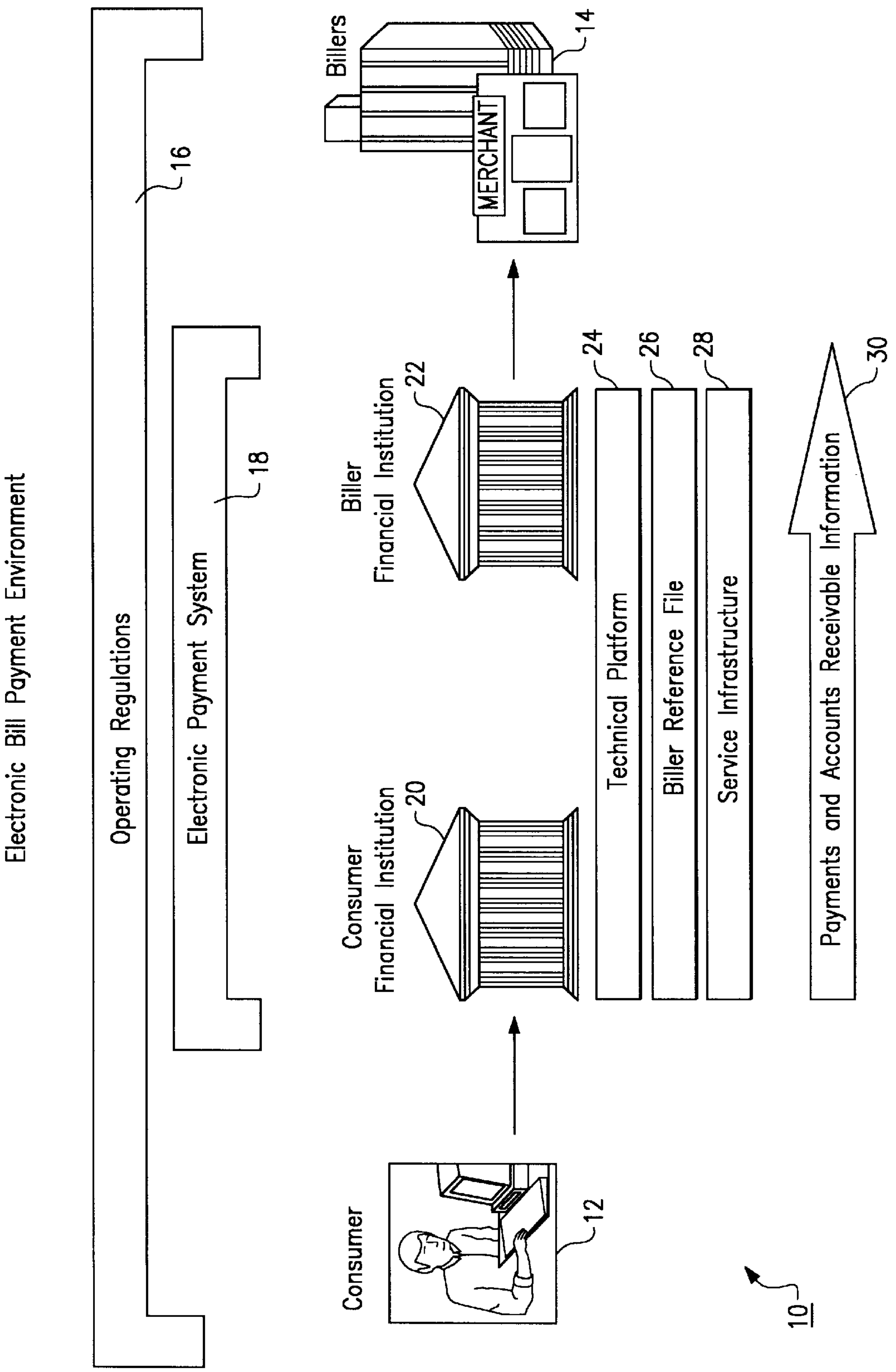
FIG. 1 illustrates a prior art electronic bill payment environment.
Figure 2:
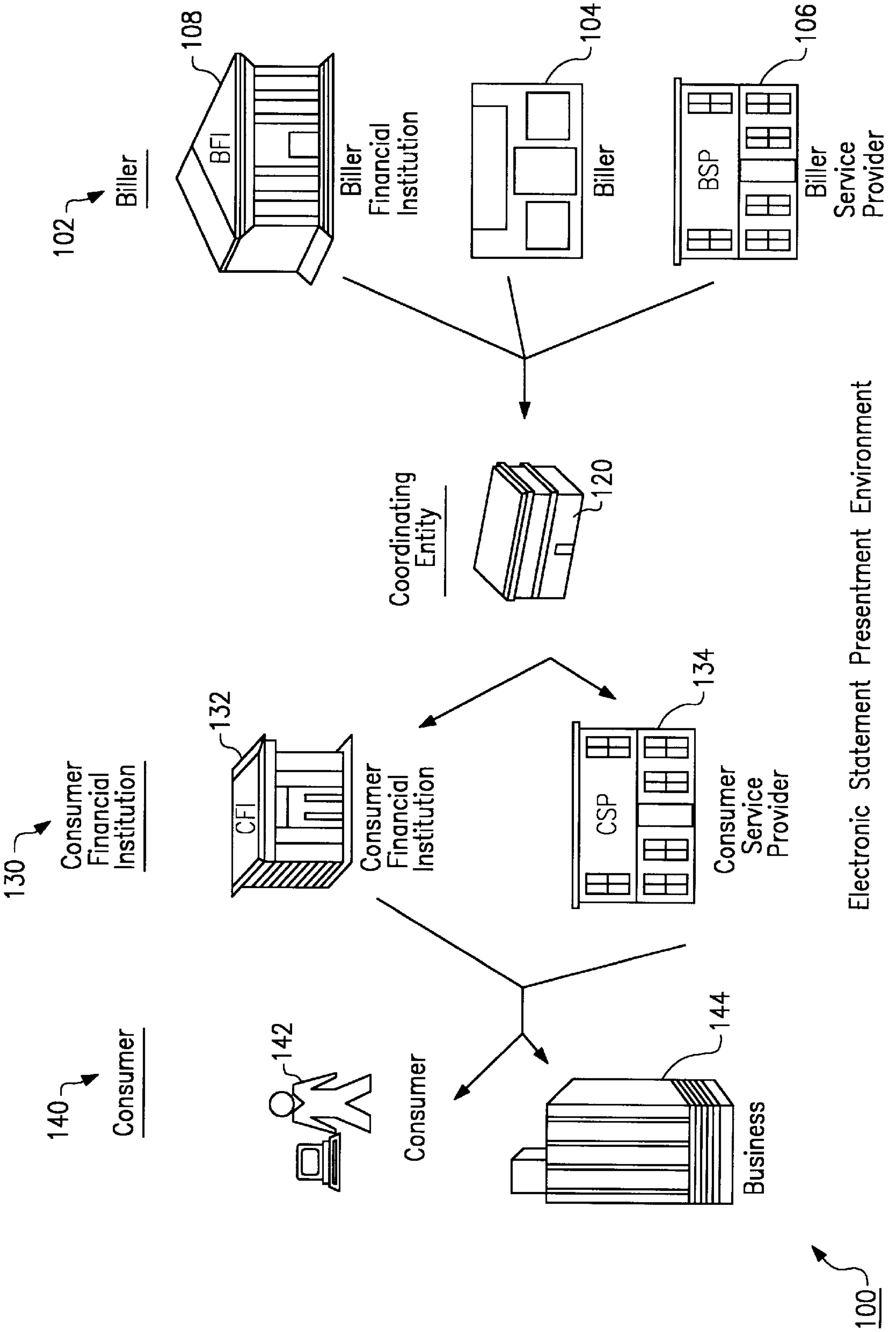
FIG. 2 illustrates an electronic statement presentment (ESP) environment according to one embodiment of the present invention.

FIG. 2 illustrates an electronic statement presentment (ESP) environment 100 according to one embodiment of the present invention. ESP environment 100 is an example of an environment in which an electronic statement presentment (ESP) system (of FIG. 3) may operate. It should be appreciated that ESP systems according to the invention are suitable for use in a variety of environments. ESP environment 100 is suitable for transmitting an electronic statement efficiently from a biller to a consumer via an ESP system.

An electronic statement originates at a biller end point 102 that may be a biller 104, a biller service provider (BSP) 106 or a biller financial institution (BFI) 108. Biller end point 102 is the point at which statements originate and are sent to the ESP system (not shown). Biller 104 is any business, merchant or organization that produces consumer statements and/or invoices to reflect the services and/or products that the biller provides. Biller 104 may also use contract services for some or all of its accounts receivable billing and statement processing functions. Biller service provider (BSP) 106 provides these services for a particular biller with which it has a relationship. BSP 106 may have relationships with, and provide statement services for, any number of billers.

Each biller also has a relationship with a biller financial institution (BFI) 108, such as a bank or other financial institution. BFI 108 may have relationships with any number of billers. For a particular biller, BFI 108 may choose to collect consumer statements from this biller or from a BSP 106 for forwarding to the ESP system, or from any combination of these. As used herein, the term "biller" refers to a biller 104, a BSP 106, a BFI 108, or any other suitable organization that generates statements.

A coordinating entity 120 is responsible for providing the core systems, operating rules, standards and procedures to facilitate reliable service operation and participation by billers and consumer financial institutions 130. Entity 120 provides hardware, software, and network communication for implementing the ESP system, although portions of the ESP system may be distributed throughout environment 100. Coordinating entity 120 also maintains a universal biller file (UBF) (as in FIG. 4) and a statement template library (shown in FIG. 3). Once coordinating entity 120 receives statement information from a biller, it forwards this statement information to a consumer financial institution end point 130 for eventual delivery to a consumer 140. The function of coordinating entity 120 may be performed by a wide variety of businesses and organizations, by a government, and/or by a combination of organizations. In one specific embodiment of the present 30 invention, the functions of coordinating entity 120 are performed by VISA of San Mateo, Calif., and communications are assisted by using its VisaNet network.

Consumer financial institution end point 130 receives statement information from coordinating entity 120. End point 130, in one specific embodiment, includes a consumer financial institution 132 and a consumer service provider 134. Consumer financial institution (CFI) 132 is a financial institution such as a bank that operates, or contracts with a consumer service provider (CSP) 134 to operate remote banking services. CSP 134 and CFI 132 may be separate entities or may be part of the same entity or institution. End point 130 is responsible for delivering statements to a consumer, generally in conjunction with remote banking services. As used herein the term "consumer financial institution" and "consumer service provider" may be used interchangeably to refer to consumer financial institution 132, consumer service provider 134 or any other suitable organization that delivers statements to consumers.

Consumer end point 140 refers to a consumer 142, such as an individual, a business 144 or any other entity that receives statements. Consumer 142 is often a retail banking customer who uses electronic banking and bill payment services. Business 144 is any organization (such as a state, government entity, or corporation) that wishes to receive electronic statements. Now that a general ESP environment 100 has been illustrated, implementation of an ESP system will be explained.

ELECTRONIC STATEMENT PRESENTMENT SYSTEM

Figure 3:
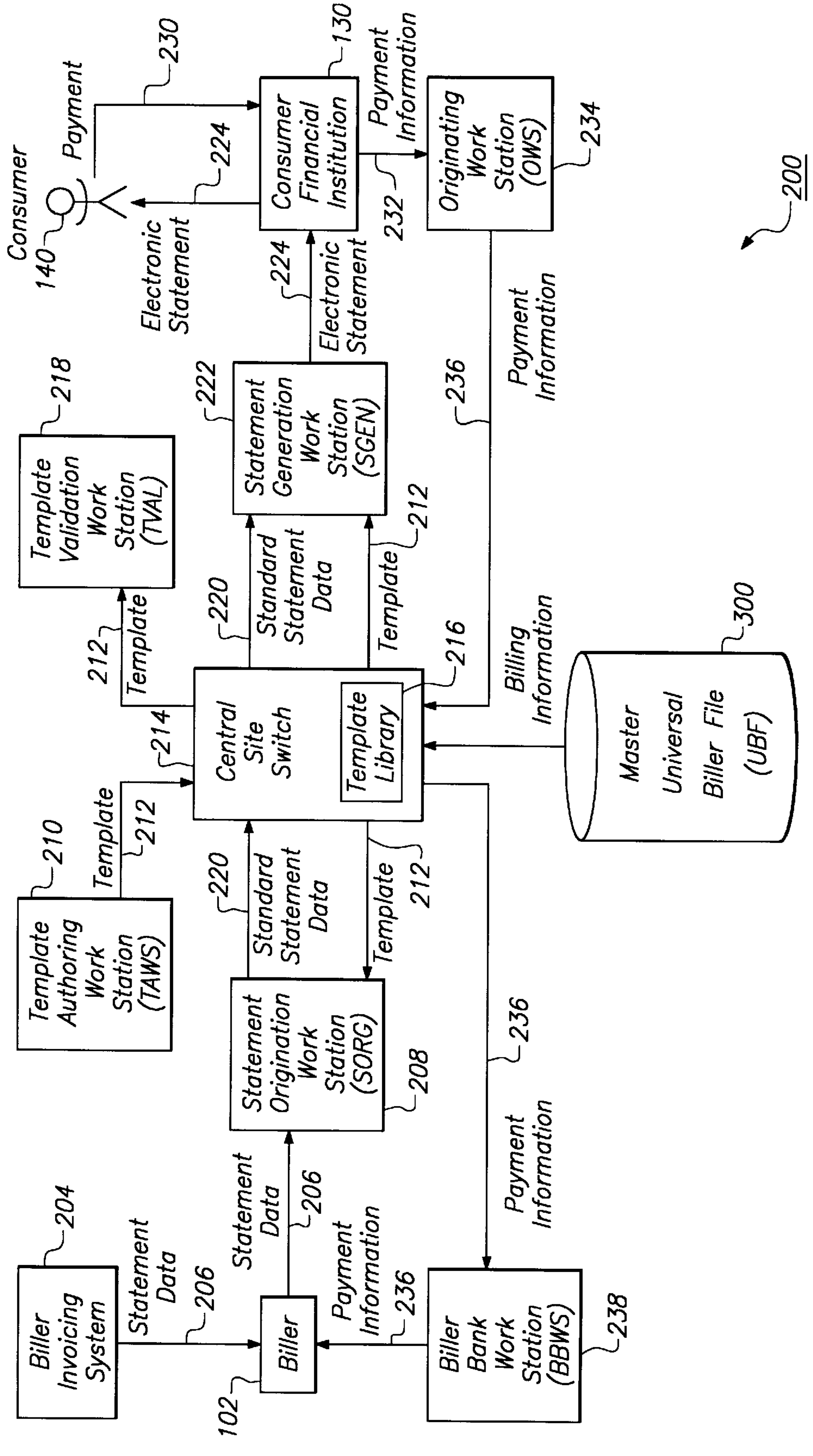
FIG. 3 illustrates an embodiment of an electronic statement presentment (ESP) system.

FIG. 3 illustrates an embodiment of an electronic statement presentment (ESP) system 200. For clarity, and for the purpose of describing certain features and benefits of ESP system 200, FIG. 3 also includes elements of an electronic bill payment system. Elements relating to the electronic bill payment system are payment 230, payment information 232, an originating workstation (OWS) 234, payment information 236 and a biller bank workstation (BBWS) 238. It should be appreciated that ESP system 200 may operate in conjunction with an electronic bill payment system or may stand alone. General operation of system 200 will now be described followed by a detailed discussion of each element.

Biller 102 receives from a biller invoicing system 204 statement data 206 for a particular consumer. Statement data 206 is transmitted to a statement origination workstation (SORG) 208. A template authoring workstation (TAWS) 210 is used to produce a template 212 that the biller wishes to use in presenting a statement to consumer 140. Template 212 is transmitted to a central site switch 214 and is stored in a template library 216. Switch 214 passes template 212 to template validation workstation (TVAL) 218 for validation and review of template 212.

SORG 208 receives template 212 from switch 214 and "validates" statement data 206 with template 212. As will be discussed in greater detail below, this validation can include manual or automated verification of data formats, etc. Once validated, SORG 208 transmits statement data 220 in a standard form 220 to switch 214. For a new template, or when a template is updated, switch 214 transmits template 212 to a statement generation workstation (SGEN) 222. Periodically during a billing cycle, switch 214 routes standard statement data 220 using information contained in the data to SGEN 222. Using template 212 and standard statement data 220, SGEN 222 generates an electronic statement 224 and transmits it to consumer financial institution (CFI) 130. CFI 130 then delivers electronic statement 224 to consumer 140 using the consumer's medium of choice. During operation of ESP system 200, switch 214 receives billing information from a universal biller file (UBF) 300 (described in FIG. 4 below) and distributes information needed to entities within the system.

As mentioned above, FIG. 3 includes elements of an electronic bill payment system. To make a payment after receiving an electronic statement 224, consumer 140 makes a payment 230 to his or her CFI 130. CFI 130 then transmits payment information 232 (including a biller identification, a customer biller account number (CBAN), amount, date, etc.) to originating workstation (OWS) 234. OWS 234 transmits payment information 236 in modified form to switch 214 that routes payment information 236 to biller bank workstation (BBWS) 238. Payment information 236 is then transmitted to biller 102 where the payment information is reconciled with the biller's accounts receivable database. An example of a suitable electronic bill payment system with which the present invention may be integrated is described in U.S. Pat. No. 5,465,206 incorporated by reference above.

Biller 102 may be any of the entities as described in FIG. 2. Biller invoicing system 204 contains the accounts receivable for the biller along with a database of all customer biller account numbers (CBAN). Biller invoicing system 204 may be any existing legacy system that a biller currently uses to send statements to consumers. Whereas billers currently use an invoicing system to print statements on paper for mailing, the present invention is able to retrieve electronic statement data from invoicing system 204 for eventual generation of an electronic statement. Statement data 206 sent to biller 102 includes all of the data normally found in an invoice or a statement for a particular consumer. In one specific embodiment, statement data 206 is transmitted in the form of a statement augmented record (SAR) when the data is sent from biller 102 to SORG 208 and includes the identifier and version of the template that the biller wishes to use in preparing an electronic statement for its customers. Typically, a biller will send a batch or billing round of statement data for numerous customers all at once, although statement data 206 may be sent for a single customer as well.

Template authoring workstation (TAWS) 210 is a computer that may be physically located at, or operated by, the biller, the BSP or the BFI. TAWS 210 utilizes current off-the-shelf authoring software packages and software described herein to create templates that contain the biller's processing instructions for displaying statements and invoices. A template contains the programmed instructions and graphic pattern for statement information to be presented to the consumer and is described in more detail below in FIG. 5. A template may include such items as a corporate logo, a special font, any graphics to be presented on the statement, enclosures and any information required by law. In general, a template authored on TAWS 210 includes resources needed to interpret the statement data that will later be combined with the template and the resources needed to produce the electronic statement at SGEN 222. These resources include data mapping information to indicate where statement data should be placed on the template, placement information for graphics, logos, and enclosures, graphics information either describing graphics or their location, font information, etc. TAWS 210 is used to gather all of these necessary resources and package them into a template that can be used by SGEN 222 to combine with individual consumer statement data in order to produce an electronic statement.

A variety of authoring tools may be used on TAWS 210. By way of example, the tools Microsoft Access version 8 and Adobe Acrobat version 3.0 have been found to have desirable results. Production of enclosures may use any desktop publishing software capable of producing output in Adobe Postscript or PDF format, for example, or in any other format supported by the system. Since PDF enclosures can incorporate links that point to Internet addresses, any web authoring tools can also be used to produce documents accessible from statement enclosures. Adobe Acrobat includes the main acrobat PDF editing package called Exchange, a PDF Reader, a PDF Writer, the Distiller program for converting Postscript to PDF, scan/capture software for converting scanned images to PDF with automatic OCR, and software for creating indices for a set of PDF documents. Because an entire template with linked external resources can be quite large (as for example in the range from 200 Kilobytes to 2 or more Megabytes in size in various specific circumstances), rather than keeping a copy of every resource for every template version, TAWS 210 may keep just one copy of any resource, thus saving space and improving maintainability. As computer and communications technology improve, the size of the entire template files are likely to increase thereby enhancing the advantages of keeping only one copy of any resource.

Central site switch 214 may be implemented on any suitable computer. By way of example, an IBM-compatible server running Microsoft Windows NT Server has been found to produce desirable results. In an alternative embodiment, switch 214 is composed of two computers, one computer for switching ESP system data to CFIs, and a second computer for switching electronic bill payments back to billers. The functionality of switch 214 as it relates to ESP system 200 will be herein described; functionality of a comparable central site switch as it relates to electronic bill payments is disclosed in U.S. Pat. No. 5,465,206. In general, switch 214 serves as a store and forward switch to route all ESP system data between system end points. It also includes a template library 216 for templates produced within system 200 and provides for data archiving, system audits and reconciliation.

Switch 214 receives templates 212 from TAWS 210 for storage in template library 216. Switch 214 may then transmit a template 212 to template validation workstation (TVAL) 218 for template validation, transmit a template 212 to SORG 208 to validate statement data, or transmit a template 212 to statement generation workstation (SGEN) 222 for generation of an electronic statement. Based upon biller and consumer identification provided in templates and statement data, switch 214 is able to route templates 212 and statement data 220 to the appropriate SGEN 222 and on to the appropriate CFI 130. As system 200 may accommodate any number of billers, during any given time period switch 214 is receiving batches of statement data from any number of billers (and any number of SORGs) and routing the statement data to any number of appropriate SGENs 222. In other words, a batch of statement data from one biller may be distributed to any number of SGENs each located in a different CFI.

Switch 214 transmits templates to the appropriate SGEN 222 when the SGEN receives its first statement data for a new template or version of the template. Alternatively, a template may be transmitted when a new template is created for a biller, or when there are changes to a template. Advantageously, a template need not be transmitted from switch 214 during every billing cycle. As a template can be quite large compared to the statement with which it is combined, it is desirable to transmit templates only when needed. Because a template may be created to contain only static data (unlike dynamic statement data that is different for every customer for every billing cycle), templates may only need to be transmitted from a TAWS 210 to switch 214 and on to SGEN or SORG infrequently. For a major biller, statement data may be sent daily from the biller into the ESP system; advantageously, the template for that biller may only need to be sent when changed, such as monthly or yearly.

In one embodiment of the invention, switch 214 passes a template 212 to TVAL 218 in order to validate the template. TVAL 218 allows coordinating entity 120 or other entity to validate that a template meets technical and informational requirements and is suitable for use within ESP system 200. TVAL 218 is any suitable computer workstation and may be, for example, located at or operated by coordinating entity 210 or CFI 130. TVAL 218 provides quality control over templates produced by billers to ensure that the produced templates are acceptable for the system, and also to ensure that a template has to been corrupted or changed by an unauthorized individual. TVAL 218 then indicates to switch 214 whether or not template 212 is valid.

Switch 214 is also able to send template 212 to SORG 208 to assist in validating statement data 206 received from biller 102. In general, SORG 208 stages the biller statement information, validates it, reformats it, sorts it and transmits it to switch 214. SORG 208 is any suitable computer workstation and may be located at, or operated by coordinating entity 120, biller 102, a BFI or a BSP. For those billers generating large volumes of statement data, it is more likely that SORG 208 may be located at, or operated by, biller 102. Alternatively, a single SORG 208 centrally located within coordinating entity 120 may service any number of billers. Factors such as biller volume, telecommunications costs, maintenance costs, etc., dictate where SORG 208 will be located.

Statement data 206 is validated within SORG 208 before time and costs are expended in shipping data through switch 214 to a CFI. Invalid or nonconforming statement data 206 is halted at SORG 208 before it goes further in system 200. For example, SORG 208 compares statement data 206 against the template for which it is intended to ensure that all of the data fields needed for this template are present within statement data 206. SORG 208 also reformats statement data 206 into two parts: a standard form that is consistent for all templates, and an optional, template-dependent form. By way of example, SORG 208 reformats statement data 206 into a statement content record (SCR) as will be described below in FIG. 9A. Of course, a wide variety of formats may be used.

If SORG 208 is not located within a biller (i.e., is located within coordinating entity 120), then a remote mail station (RMS) is used within biller 102 to communicate within SORG 208. A remote mail station is a remote terminal used by both billers and CFIs to access centralized SORG and SGEN functionality. Centralized SORG and SGEN configurations with remote mail stations are typically used for lower volume situations. The mail station manages all aspects of secure store and forward data transport between the participant's system and the ESP system. The participant need only read from, and write to, shared directories on the mail station hard drive. In one specific embodiment, CompuServe is used to provide connectivity between remote mail stations and SORGs or SGENs.

In a remote mail station configuration, either or both the SORG and SGEN are located centrally within coordinating entity 120 and remote mail stations used for communicating with these stations are located within biller 102 and CFI 130, respectively. In a distributed configuration, SORG 208 is located within biller 102 and SGEN 222 is located within CSI 130. In this configuration, each SORG 208 or SGEN 222 also includes mail station functionality. The distributed configuration is more cost effective when volumes are relatively high from a biller or from a CFI to its customers. Advantageously, ESP system 200 is capable of accommodating both configurations concurrently. For example, an individual CFIs remote mail station can be replaced by an on-site SGEN when it becomes the most economic alternative while the reaminder of the ESP system continues to use remote mail stations.

Switch 214 also has the ability to track messages in ESP system 200 that pass through it. In particular, switch 214 is able to audit the collection, transport and delivery of electronic statements for control purposes and to ensure system integrity. In one embodiment, audit tracking is performed by analysis of message log files kept by switch 214.

Additionally, the capability to track, record and analyze messages passing through switch 214 allows ESP system 200 to monitor that entities within system 200 comply with the operating regulations of the electronic statement presentment environment. In particular, tracking the interchange of messages allows the system to flag unterminated conversations that might have adverse affects to the system and/or to biller, consumers or CSPs. For example, messages regarding subscription requests are monitored to ensure they are completed. As described in FIG. 8, a subscription request from a consumer is followed by a biller notification regarding whether the request has been accepted or not. Problems might result should a consumer believe he or she is enrolled, when in fact a biller had rejected that consumer and a message to that effect was not received by the consumer. Other messages related to adding, changing, replacing or terminating subscriptions may also be monitored.

Another example is when TAWS 210 requests a unique template identifier from switch 214 for a newly created template. In this situation, TAWS would expect a message back providing such a unique template identifier. Another example is when TVAL 218 requests a certain template for validation. System 200 is able to monitor if the template is actually sent to TVAL for validation. Other examples include template requests from SORG 208 or SGEN 222. Another example is a request for template by an SORG 208 or by an SGEN 222 and its transmission by switch 214. In one specific embodiment of the invention, system 200 is able to monitor messages by keeping track of the type of ADV message transmitted, its originator, the recipient, and information contained in the message (such as biller identification, CSP identifier, CBAN, template identifier, etc.). Examples of ADV messages used by system 200 are presented in Table A. The result is an ability to monitor and control message traffic throughout system 200 to ensure the system is operating properly and efficiently.

Once standard statement data 220 has been received at switch 214, the data is then routed by switch 214 to the appropriate SGEN. Statement generation workstation (SGEN) 222 may be implemented upon any suitable computer. SGEN 222 is centrally located within coordinating entity 120 for low volume situations and may service a number of CFIs. Alternatively, for high volume situations, there may be an SGEN located at the CFI 130. For example, a separate SGEN may be located within each bank, consumer service provider or other consumer financial institution that produces high volumes of electronic statements for its customers. Consideration of statement volumes, telecommunications costs, hardware maintenance, etc., are taken into account when deciding where to locate an SGEN. In CFIs that use a centrally located SGEN, a remote mail station is provided within the CFI. In such an arrangement, the CFI need read only from, and write to, shared directories on the hard drive of the mail station.

SGEN 222 assembles each electronic statement by merging the appropriate template from a particular biller with standard statement data 220 representing a customer of that biller. Once an electronic statement 224 is assembled, it is transmitted to CFI 130 for eventual delivery to consumer 140. Each SGEN 222 may include any number of templates for a particular biller, and may include templates for any number of billers. Thus, a-biller may decide which template to use for particular consumers, times of year, or other billing situations and have these templates on hand. In one specific embodiment, SGEN 222 generates an electronic statement in an Adobe PDF format. A wide variety of other formats may also be generated. By way of example, formats such as HTML statements and EDI 810 invoices may also be generated. In addition to the electronic statement delivered to a consumer, SGEN 222 also delivers to the CFI several records of fielded data that can be used to display the alphanumeric data from the electronic statement on nonconforming display devices (such as voice and screen telephones and hand-held communication devices).

Once CFI 130 receives electronic statement 224 it then delivers the statement to consumer 140 using any method chosen by CFI 130. It is the responsibility of a CFI to format and deliver electronic statement 224 in a form suitable for viewing by its customers. Alternatively, a biller may agree to create a variety of templates, each well suited for a different medium used by a consumer to communicate with a CFI. Or, a biller may supply a variety of templates each suitable for handling a different data standard (such as EDI 810) that would enable a CFI to present electronic statements in a variety of forms to its customers. At a very minimum, the pertinent data in an electronic statement (such as biller name, amount and units) can still be presented to a consumer without any graphics, enclosures, or other additions to an electronic statement by using fielded statement data sent along with the electronic statement. For example, a CFI may choose to present electronic statements to a consumer in a variety of media including television, Internet, video phone, personal digital assistant, or other proprietary communication network of the CFI.

As discussed above, FIG. 3 includes elements of an electronic bill payment system. Once consumer 140 has reviewed electronic statement 224 he may wish to pay using such an electronic payment system. In this situation, a payment instruction 230 from consumer 140 is transmitted via OWS 234, switch 214, and BBWS 238 back to biller 102.

ESP system 200 is also able to perform a range of processing tasks on a periodic basis at the end of each business day. These tasks include: system balancing; reconciliation with system endpoints; management reporting; invoice and administrative message archiving; data collection for monthly transfer to a billing system (such as VISA's Integrated Billing System); and remote endpoint performance information compilation.

UNIVERSAL BILLER FILE (UBF)

Figure 4:
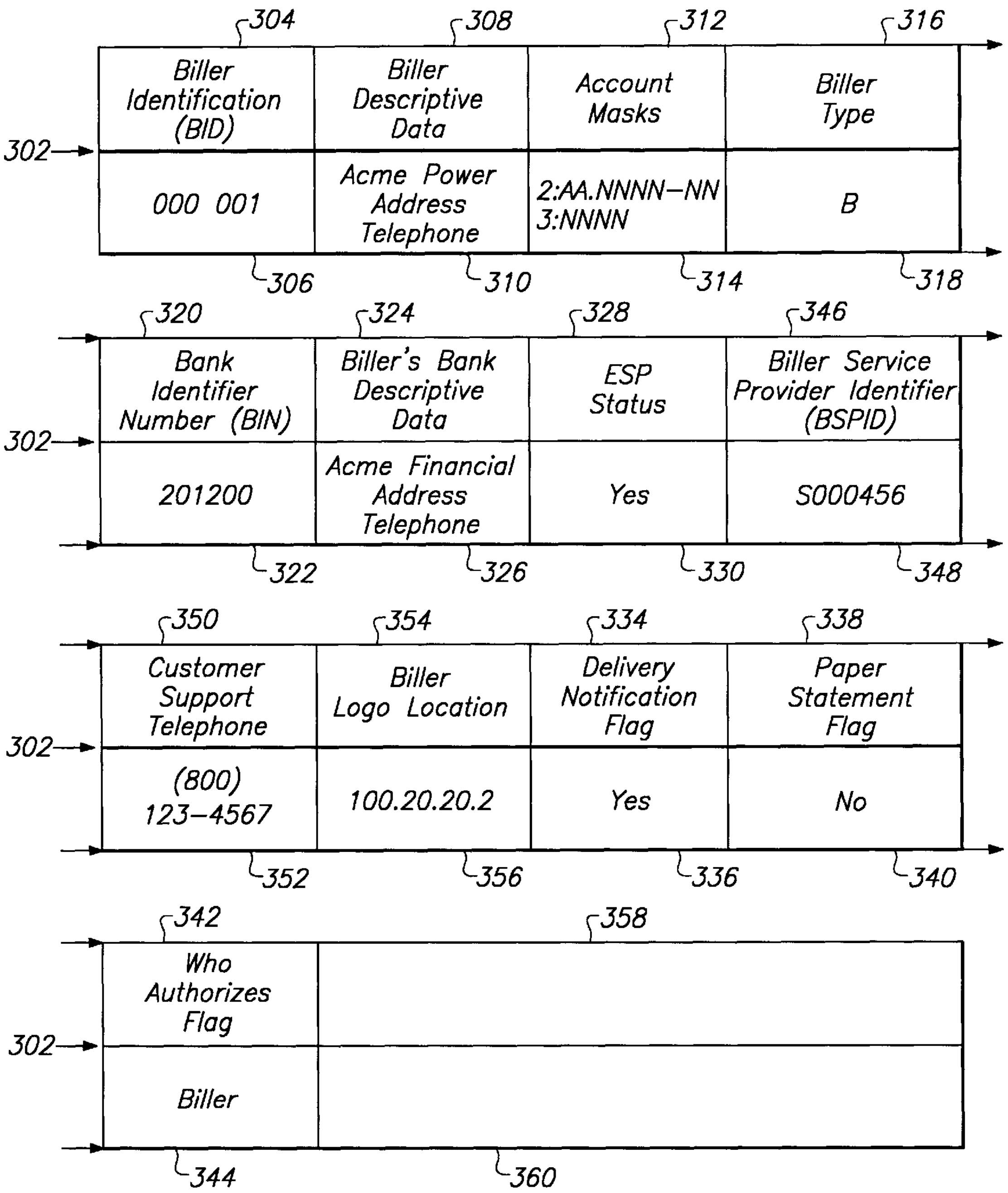
FIG. 4 illustrates symbolically a record in a universal biller file (UBF).

FIG. 4 illustrates symbolically information available in a universal biller file (UBF) 300. In one embodiment of the invention, UBF 300 is a database of biller information implemented on the same computer on which switch 214 is implemented. UBF 300 may be implemented in a wide variety of manners. By way of example, the UBF may be implemented in a Microsoft SQL Server database on an IBM-compatible computer running a WINDOWS NT operating system. FIG. 4 illustrates one record 302 within UBF 300 for one particular biller participating in the ESP system. Due to page space constraints, record 302 is illustrated as being broken into parts in FIG. 4, although conceptually it can be viewed as a single row of information for a single biller. UBF 300 is periodically updated with information from a central database of biller information. In one embodiment of the invention, this central database is located within a service bureau, such as operated by VISA. In this embodiment, information from the central database is sent periodically via a computer network to UBF 300. The central database is an on-line data entry application with the ability to add, change and/or delete biller information, and is part of a distributed system for passing information. In other embodiments, the central database may actually be any number of databases on separate computers from which biller data is transferred to UBF 300.

UBF 300 is able to distribute its biller information over a local area or wide area network to other entities within ESP system 200, namely SORG 208, SGEN 224, TAWS 210, TVAL 218, BBWS 238, and OWS 234. Biller information may be distributed using any suitable protocol and rules. In one specific embodiment, a general rule is that one biller's information is not distributed to other billers. Also, biller information is only distributed as necessary to entities that require the biller information for their operation. Thus, UBF 300 may be considered a "master" file which keeps a number of smaller, distributed files current.

As shown in FIG. 4, UBF 300 includes a record 302 for each biller in the system. For example, record 302 contains information relating to the Acme Power Company by way of a number of fields. It should be appreciated that any number and types of fields may be present within UBF 300 in order to store information about a particular biller. By way of example, master UBF 300 includes the fields shown.

Biller identifier field 304 uniquely identifies one biller within the ESP system. By way of example, the value for field 304 is a string of digits 306 that uniquely identify Acme Power Company within the ESP system. Biller descriptive data field 308 contains any relevant information that helps to describe the biller such as company name, address, telephone numbers, mailing information, and other descriptive information. For example, field 308 contains name and address information 310 for the Acme Power Company. Account masks field 312 contain numbers (or even the account masks themselves) that identify the formats for a customer biller account number (CBAN) that the biller will accept for a customer. For example, if all of the account numbers for a particular biller are of the format "AA.NNN-NN" (i.e., two letters, a period, four numbers, a dash followed by two numbers), then account masks field 312 will contain a number that identifies that mask as being an acceptable customer account number for that biller. Because of changes within a biller's invoicing system and/or because of mergers between two billers, a biller may wish to support more than one format for a customer account number. For this reason, account masks field 312 may contain more than one number that identifies a particular customer account number format that is acceptable by that biller. Account masks field 312 may use any of a variety of nomenclatures to identify account masks acceptable by a biller. Field 312 may even contain the masks themselves. By way of example, field 312 may be any number of integers in the range of 1 to 500. Value 314 for accounts masks field 312 includes the integers "2" and "3" indicating that the Acme Power Company accepts customer account numbers in the format of "AA.NNNN-NN" and "NNNN". Account masks field 312 helps to describe the data quality of a customer account number.

Biller type field 316 indicates the type of billing statements that a biller is able to provide. Field 316 may indicate in any suitable fashion a wide variety types of statement formats that a biller supports. By way of example, a biller may provide a standard electronic statement or a government electronic statement. A standard statement may be in a graphical format such as PDF files, while a statement suitable for government entities may be produced in EDI 810 format. In one specific embodiment, should the biller support a standard electronic statement, then the letter "E" is present, if the biller supports a statement suitable for the government then the letter "G" is present in this field. Value 318 for this field is the letter "B", indicating that the Acme Power Company supports both a standard electronic statement and a government electronic statement. Of course other statement formats supported by a biller may also be present in field 318.

Field 320 contains a bank identifier number (BIN) that identifies the biller's bank. The BIN may be in any suitable format. By way of example, BIN 322 is a six digit number that uniquely identifies the bank used by the biller. Field 324 contains the biller's bank descriptive data. This descriptive data contains information such as bank name, address, telephone numbers, mailing information, and other descriptive information. For example, field 324 contains name and address information 326 for the Acme Financial Bank.

ESP status field 328 indicates whether a particular biller is participating in the ESP program. For example, "yes" value 330 indicates that Acme Power Company is participating in the program and will provide electronic statements to a customer. A "no" value would indicate that a particular biller would not be supplying electronic statements to a customer. Delivery notification flag 334 indicates whether or not the biller wishes to be notified of the circumstances surrounding delivery of the electronic statement to a customer. For example, a "yes" value 336 indicates that the biller wishes to be notified when the electronic statement is delivered to a customer and the time and date of the delivery. A "no" value would indicate that the biller does not wish to receive such information. Alternatively, a biller can ask for all notices by subscription, or can ask for a list of statements not downloaded.

Paper statement option field 338 indicates whether a biller still desires to send paper statements through the mail to various of its customers. For example, a "no" value 340 indicates that the Acme Power Company does not wish to continue sending paper statements to its customers, and desires to send electronic statements through the ESP system. A "yes" value would indicate that a biller still sends paper statements to various of its customers.

Field 342 "who authorizes customer" indicates which entity within the system will authorize a customer's request to participate in the ESP program. For example, a "biller" value 344 in field 342 indicates that the biller itself wishes to authorize all customer requests for participation in the ESP program. An alternative value in field indicates that any customer may participate in the ESP program. Field 346 is a biller service provider identifier (BSP ID) that is a mailbox address for routing information to the biller service provider. The BSP ID is used to determine to where a customer subscription should be routed. In this way, when a customer has been authorized for participation in the ESP program, the biller service provider may be notified that the customer now wishes to receive electronic statements. For example, the value "S000456" 348 of field 346 indicates an identifier for the biller service provider that provides billing services for the Acme Power Company.

Also included within UBF 300 is a customer support telephone number field 350 that includes a telephone number 352 of customer support for the Acme Power Company. Logo location field 354 indicates where the logo for a particular biller may be found. For example, value "100.20.20.2" 356 indicates that the logo for the Acme Power Company may be found within the ESP system at a computer indicated by the value shown. This logo is used by the customer service provider when advertising to its customers all of the billers that offer electronic statements. For example, should a customer service provider use an Internet web site in order to advertise all of the billers that can provide electronic statements to its customers, the customer service provider may use field 354 in order to locate the logo for a particular biller. Once the CSP has located and downloaded this logo for a particular biller, it then presents this logo (along with others) on its web site to advertise to its customers from whom an electronic statement may be received. Any number of other fields 358 containing data 360 useful for the present invention may also be present in UBF 300.

As described above with reference to FIG. 3, portions of UBF 300 are distributed to other locations within the ESP system that have a need for particular biller information within UBF 300. Use of such a master UBF 300 allows central control of a large amount of information about billers, routing, and specific ESP requirements. Also, only that information needed by an entity need be dispersed from the master UBF to that entity.

STATEMENT TEMPLATE EXAMPLE

Figure 5:
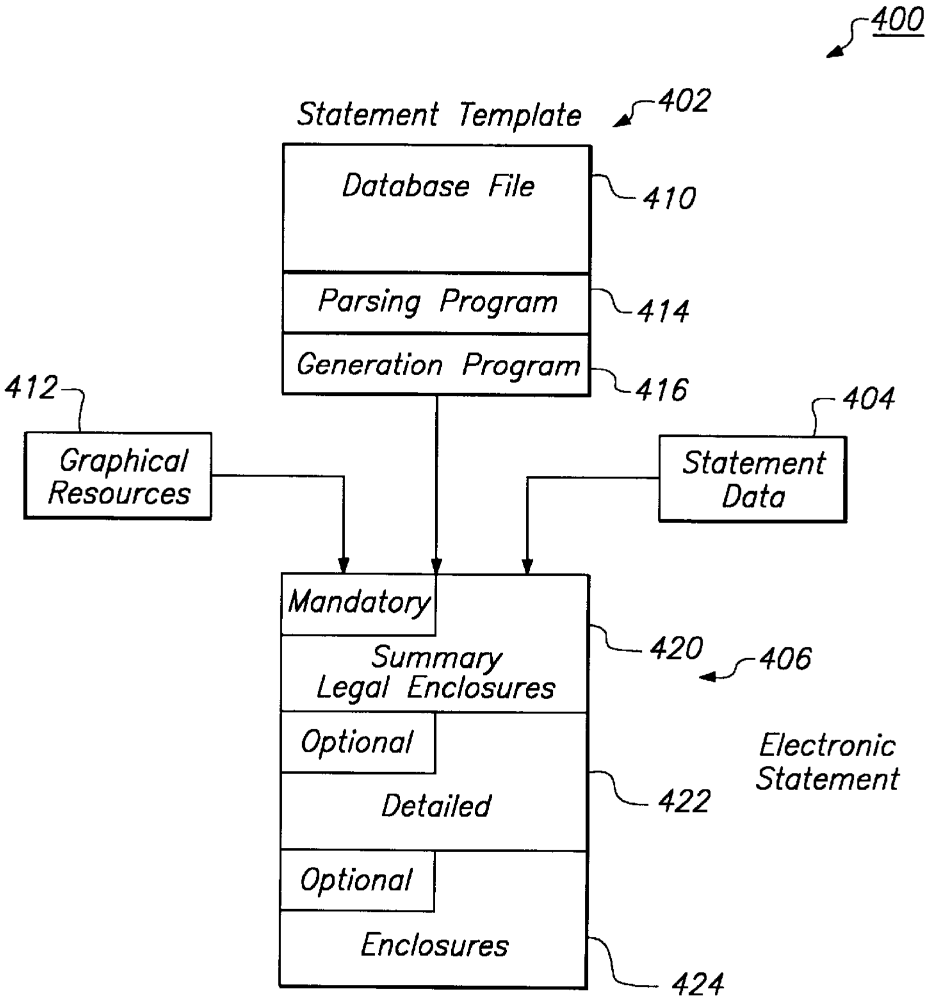
FIG. 5 illustrates symbolically the use of a statement template and statement data to produce an electronic statement.

FIG. 5 illustrates symbolically 400 the use of a statement template and statement data to produce an electronic statement. Shown is a statement template 402, statement data 404, and an electronic statement 406. Statement data 404 is that data originating from a biller's invoicing system that is the raw data that a biller wishes to convey in a statement or invoice to a consumer. Statement data 404 may include common, required statement data and template-specific data. For example, statement data 404 includes a wide variety of information such as customer name, address, account number, type of service, units used, total cost, yearly comparison data, account status information, or any other consumer specific information that a biller wishes to convey, or typically conveys on paper statements. Using statement template 402 and statement data 404, an SGEN 222 processes individual statements for each biller and creates output files of "fully rendered" statements for a CFI to deliver to customers.

In one specific embodiment of the present invention, a template is represented in several versions. In this embodiment, once a template is validated it is not allowed to be changed, so template versions provide a method of updating a template in a controlled manner. Each version is a separate MDB file (for example) with optional external resources. Template versions are validated by TVAL 218 and specified in statement transmissions from a biller.

In another specific embodiment of the present invention, an electronic statement is produced in PDF format. For PDF format, a consumer would use a program such as Adobe Acrobat Reader version 3.0 to read electronic statements. However, certain consumer devices such as screen phones are not capable of viewing PDF files and are known as "nonconforming" devices. Consumers with nonconforming devices can still benefit from the ESP system by accessing fielded statement data delivered to the CFI along with the PDF files. The ESP system also supports nongraphic formats such as may be required by the federal government. In one specific embodiment, an electronic invoice is produced in EDI 810 format. The determination of which format, on an invoice-by-invoice basis, is at the biller's discretion.

A template may be produced in a variety of forms desired by the biller. For example, a biller may use one particular template or may have numerous templates for use for different consumers. Different templates may also be used for different times of the year, different geographic regions, differing demographics among customers, etc. A biller may have a template using graphics, and an equivalent template for the same data that uses no graphics. Such a template with no graphics is suitable for the federal government in paying a utility bill, for example, and in particular for the General Services Administration (GSA). Furthermore, a biller may even design a custom template for a large customer that has special needs. Preferably, a template is used at SGEN 22 to generate a statement in a format such as PDF. Any other output data format may also be used such as HTML, ANSI electronic data interchange (EDI) 810 format etc. A biller may also provide a template for special needs such as automated file transfer of invoice data to customer accounts payable systems and automated invoice processing (pre-authorized invoice payment on receipt).

Creation of a template is described below in FIG. 6B. Generally, the process of creating a template entails: defining tables and relations sufficient to represent the most general case of the statement; laying out graphically the data elements to be placed on the statement; programming code to generate an instance of the template; programming code to map the biller's existing data from an invoicing system structure into tables; developing and using test data to verify correct operation of the parsing module; and developing and using parsing module output to verify correct operation of the generation module. Templates can also make reference to resources in files outside of the main file in which it is contained. Examples of such resources include stand-alone generic enclosures in PDF format (for example), logo bit maps, custom fonts, other images to be imbedded, and multimedia files (sounds, movie clips, etc.) referenced by PDF documents.

The present invention lets billers control the "look and feel" of their customer's statements and enclosures through the use of a statement template. The template concept accomplishes two important objectives: billers are able to compose their own templates using standard graphics tools and a common programming language which gives them complete control over the look and feel of their statements or invoices; and data flow through the ESP system is reduced to the extent practical since static items (such as logos, headers, enclosures and other graphics) are sent to an SGEN only once (with the template), and not repeatedly with each customer record of statement data for each billing cycle.

Statement template 402 is a conceptual block diagram of an example of a template that includes four primary components. Database file 410 is an electronic file that has a variety of parts. Creation of file 410 is described below in step 534. File 410 may be implemented in any suitable database language. By way of example, file 410 is a Microsoft Access version 8 database file (or MDB file). More generally, file 410 includes an MDB file and associated external resource files. For example, file 410 includes tables, relations, reports, modules, queries, forms, test data and macros. Tables are grids for holding data that identify the data to be included in a report and hold test data. Relations specify logical relationships between tables of data and distinguish between statement level, section level and detail level data elements. A report definition provides a graphical means for printing or displaying data. Combining data with a report definition produces a personalized document. Modules are code (such as in Visual Basic) capable of controlling any Access component and are defined for both the parsing and generation programs. Queries are saved expressions of relationships between tables and are used with the Visual Basic code modules.

Graphical resources 412 may be included with template 402, but are preferably attached to the template. Graphical resources 412 include logos, custom fonts, bitmaps, inserts, and hyperlinks to activate transfers to Internet sites, sound and video clips, etc. Parsing program 414 is a program that reformats the statement data (in ASCII format, for example) provided from the biller's invoicing system into tables used by the ESP system. Although parsing program 414 may be written in any suitable language, Visual Basic has been found to work well. Generation program 416 creates a graphical image of the customer's electronic statement using the above elements of the statement template. Generation program 416 may be written in any suitable programming language, although Microsoft Access Reports have been found to work well. Also included within a template is test data created at TAWS 210 that may be used by TVAL 218 or SGEN 222 to exercise the statement generation program to see if it is operating properly.

A brief review of printed invoices is instructive for developing a conceptual map between printed invoices and electronic invoices. For the purposes of this discussion, invoices will be discussed, although the present invention is applicable to delivery of electronic statements that relate to a paper statement. A printed invoice contains two parts, the paper stationery and the data printed on it. The stationery is typically printed beforehand with static information and does not change between invoices. The data printed on the stationery does change across customers and billing cycles. Most printed invoices use a hierarchical data structure including statement header fields, statement detail fields, section header fields, section detail fields, section footer fields and statement footer fields.

For example, a fixed format invoice, e.g., a mortgage statement, would contain only a fixed number of statement fields, some of which (insurance) might be absent for some invoices. A credit card statement goes one level of complexity further. It contains a fixed number of statement header fields, some of which might be absent, together with the variable number of detail records containing a fixed number of detail fields, some of which might be absent. A telephone bill can be quite complex. It generally contains statement header fields as well as logical sections for various services, each of which can have its own header and footer. Overlain on this is the possibility of formal sections due to paging. For printed statements, enclosures are typically created as separate documents, and are rarely personalized. Automated mailing equipment is used to insert enclosures into envelopes, often right up to the postal weight limit. Sometimes, statements are batch processed in an order which allows different enclosures to be inserted in different batches.

Electronic invoices may also include enclosures. They are designed to give billers complete control over the look and feel of invoices. Billers are able to replicate almost the exact look of their current printed invoices. As consumers become familiar with an ESP system, billers can make use of features unique to electronic media, such as Internet links, custom charts, radio buttons, drop-down lists, etc.

Electronic statements (including invoices) are divided into mandatory and optional sections as defined by the biller. Mandatory sections are automatically presented to the customer, while optional sections are downloaded and presented only at the consumer request. To minimize download time and thereby improve customer acceptance, the mandatory portion of statements may be restricted in size and content.

Exemplary electronic statement 406 includes a mandatory section 420 and two optional sections 422 and 424. Mandatory section 420 includes actual statement or invoice data and any legally required enclosures. The summary section is intended to represent the payment stub that typically comes with a printed invoice, although it may be more detailed. The summary section could include a URL or electronic mail address for customer access to detailed transaction records. Detailed section 422 is presented to the consumer on request. It is intended to represent the detail accompanying lengthy bills like some credit card and telephone bills. Detailed section 422 may also be made available at the biller's discretion. In one specific embodiment of the invention, the summary and detail sections of an electronic statement are produced as distinct Access reports and are written to disk in Postscript format as two distinct files. Each Postscript file is then converted to PDF using Adobe's Distiller program.

Enclosures 424 may be one or more custom selections, either from a library of generic enclosures or produced specifically for the consumer. When present, optional enclosures are made available to consumers by the CFI but are downloaded at the consumer's option. Using embodiments of the present invention, electronic statements have the capability to present a variety of enclosures. Generic enclosures can be created with any desktop publishing tool that outputs a result in any format supported by the ESP system. By way of example, tools may output enclosures in Adobe Postscript format, which can then be converted to PDF format, using Adobe's Distiller program. Alternately, Adobe supplies WINDOWS, Macintosh and UNIX printer drivers called PDF Writer that can be invoked from any such program to produce PDF directly. Each generic enclosure is preferably an external resource to the template.

Personalized enclosures are typically custom marketing materials. Like invoices, personalized enclosures may be created as distinct Microsoft Access reports and ultimately produced in PDF format. Because personalized enclosures are created for each customer, they are more costly than selecting from a library of generic enclosures. Billers can also stipulate that certain enclosures are mandatory. Statutes or regulations may also stipulate the certain enclosures be mandatory.

BILLER SETUP EXEMPLARY FLOWCHART

Figure 6A:
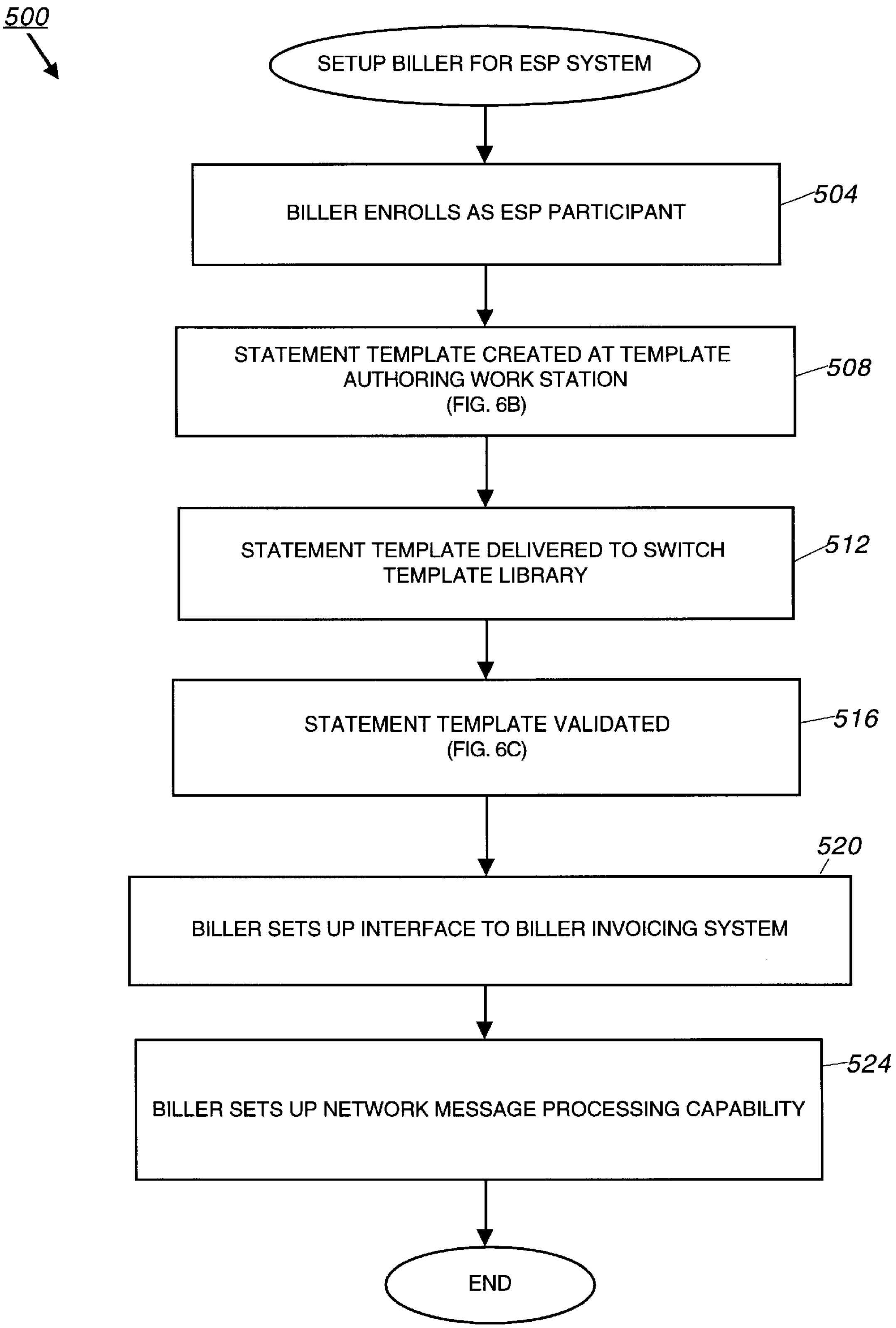
FIG. 6A is a flowchart describing one embodiment for setting up a biller for participation in the ESP system.

FIG. 6A is a flowchart 500 describing one embodiment for setting up a biller for participation in the ESP system. Flowchart 500 sets up various aspects of the ESP system related to the biller so that the biller is ready to participate in the system. As used herein, biller refers not only to a merchant or business, but also a BFI or BSP. A biller may also be enrolled in an electronic bill payment system before enrolling in the ESP system.

In step 504 the biller enrolls as an ESP participant. In one specific embodiment, the biller fills out an ESP registration form and sends it to the coordinating entity. This registration form may contain a variety of fields, and preferably contains fields similar to those described in UBF 300 of FIG. 4. Subsequently, the biller record in UBF 300 for this particular biller will be populated with the information from the form. In one specific embodiment, an ESP registration form similar to the electronic bill payment registration form used in U.S. Pat. No. 5,465,206 has been found to work well. During this step, some unique endpoint identification is assigned to the biller, for example by assigning a biller identification number in order to uniquely identify the biller within ESP system 200, and by assigning a mailbox address to either a remote mail station located at the biller or to an SORG 208 located at the biller.

In step 508 a statement template is created at TAWS 210. This step is described in more detail below in FIG. 6B. In step 512 the statement template created in step 508 is delivered to switch 214 and placed in template library 216. In one specific embodiment of the invention, TAWS 210 first sends a message to switch 214 requesting a unique template identifier for the recently created template. Switch 214 then sends back a unique identifier for the newly created template, and in return TAWS 210 sends back to switch 214 the newly created statement template along with its unique identifier. Alternatively, a template identifier may be requested from switch 214 before creation of the template in step 508.

The statement template is then stored in template library 216 for later validation and distribution to other workstations in the system. TAWS 210 may communicate the unique template identifier back to the biller in many ways. A message may be sent through the ESP system, or an operator may manually telephone an operator of the biller's invoicing system. By informing the biller of the identifier for the created template, the biller is then able to associate this identifier with those customer records in its invoicing system it desires to have receive this template.

In step 516, the statement template is validated; this step will be described in greater detail below in FIG. 6C. Step 516 determines if a template is valid, if it is not valid then it remains on inactive status and may not be used and an invalid template message is sent. A valid template, however, is indicated as being operational and may be used within the system and a valid template message is sent. Once a template is valid, it is available for subscriptions and its availability is broadcast in a message to CSPs or CFIs within the system.

In step 520 the biller sets up an interface from its own biller invoicing system 204 to enable consumer data within that system to conform to standards within the ESP system. In order that statement data from biller invoicing system 204 be validated within SORG 208, statement data supplied from invoicing system 204 is preferably in a format that is compatible with the statement template created above in step 508. Alternatively, should a standard format for statement data already exist and be acceptable to the ESP system, in step 508 the statement template is created to conform to that format.

In another embodiment, the biller may write a software program to extract statement data from the biller's invoicing system 204 to produce extracted statement data in the form of a Statement Augmented Record (SAR). Template parsing program 414 is then used to read the extracted data. The biller may choose to do processing and in reformatting in whichever environment is most convenient. For example, a mainframe statement production system or an Access/Visual Basic environment have been found to work well for this purpose.

In one specific embodiment, consumer statement data within invoicing system 204 is arranged to be transmitted to SORG 208 in statement augmented records (SARs). An SAR includes statement data for a particular consumer, including identifiers indicating with which template and which version the statement data should be combined, a bill of lading file, etc. In general, an SAR may take a variety of forms, any of which are suitable for interfacing existing consumer statement data within invoicing system 204 to a format of statement data expected by ESP system 208 and the statement template created in step 508. Statement data 206 may be augmented at any suitable location. In one specific embodiment, a remote mail station (RMS) located at the biller augments the data. For billers having an SORG 208, the SORG augments the statement data. Alternatively, the biller may modify invoicing system 204 to augment the statement data.

In step 524, the biller sets up network message processing capability to enable the biller to communicate with other entities within the ESP system using a standard message protocol. In other words, the biller sets up his ability to not only respond to messages from the ESP system, but also to accept messages from the system. A wide variety of message protocols may be used to communicate information within ESP system 200. One skilled in the art of financial message processing would be able to implement any of a number of techniques for message processing within the ESP system. For example, messages similar to the ISO 8513 series 600 advisory messages may be used in an embodiment of the present invention.

In one specific embodiment, a protocol using administrative messages is used to transport messages between system participants. Message routing is based upon information contained within each transaction. Messages communicate the various actions and requests between ESP participants. Typical message types may include: customer requests to enroll in the ESP system; customer requests to modify or terminate their subscription; a CFI request for a retransmission of a previous statement file stored on the SGEN for a limited period of time consistent with data retention requirement; biller notifications of a change or termination in ESP system subscription; and responses to previous messages requesting action.

From the biller's perspective, messages are sent and received by the biller's remote mail station (or by the SORG located at the biller), and by the biller's TAWS. Billers (and CSPs) develop software to read and interpret incoming messages, to update their own databases, and to write messages as needed in response. It should be appreciated that each biller's software may be unique, since different billers employ different business rules, accounting systems, and computer systems.

In one specific embodiment, the administrative (ADV) messages described in Table A have been found to produce desirable results. These messages are illustrative of one specific embodiment; other similar types of messages incorporating the broad functionality required may also be used to implement the present invention. For example, messages may include the following functionality. The ESP system may notify billers when statements sent have not been downloaded by the consumer prior to a statement-specific biller-specified expiration date. For example, the biller might set the expiration date for a particular template to be one week before the late payment date period. This allows the biller's customer service department to contact the recipient in time to avoid penalties. The ESP system may also send to the biller positive notification about statement delivery details. This message is used to return the date in time that specific statement items (for example, summary, detail, enclosures) were downloaded by the consumer. This information helps billers optimize the design of their statements.

To respond to other messages, a biller may need to augment its existing consumer database in order to process subscription data within the ESP system. By way of example, each consumer record contains a unique key enabling the biller to identify the consumer (a customer biller account number—CBAN), consumer name, consumer address, statement date, etc., and any ESP system options that the consumer has selected.

In a more specific embodiment, an ADV message is first compressed and then sent as a single attachment in an encrypted, signed, Microsoft Exchange electronic mail message over a private telecommunications network managed by an entity such as VISA. Remote mail stations, an SGEN and/or a TAWS authenticate the sender, decrypt the message, and write the contents as ordinary text files at the mail station. Once step 524 is complete, FIG. 6A is done, and the biller is setup for participation in ESP system 200.

TEMPLATE CREATION EXEMPLARY FLOWCHART

Figure 6B:
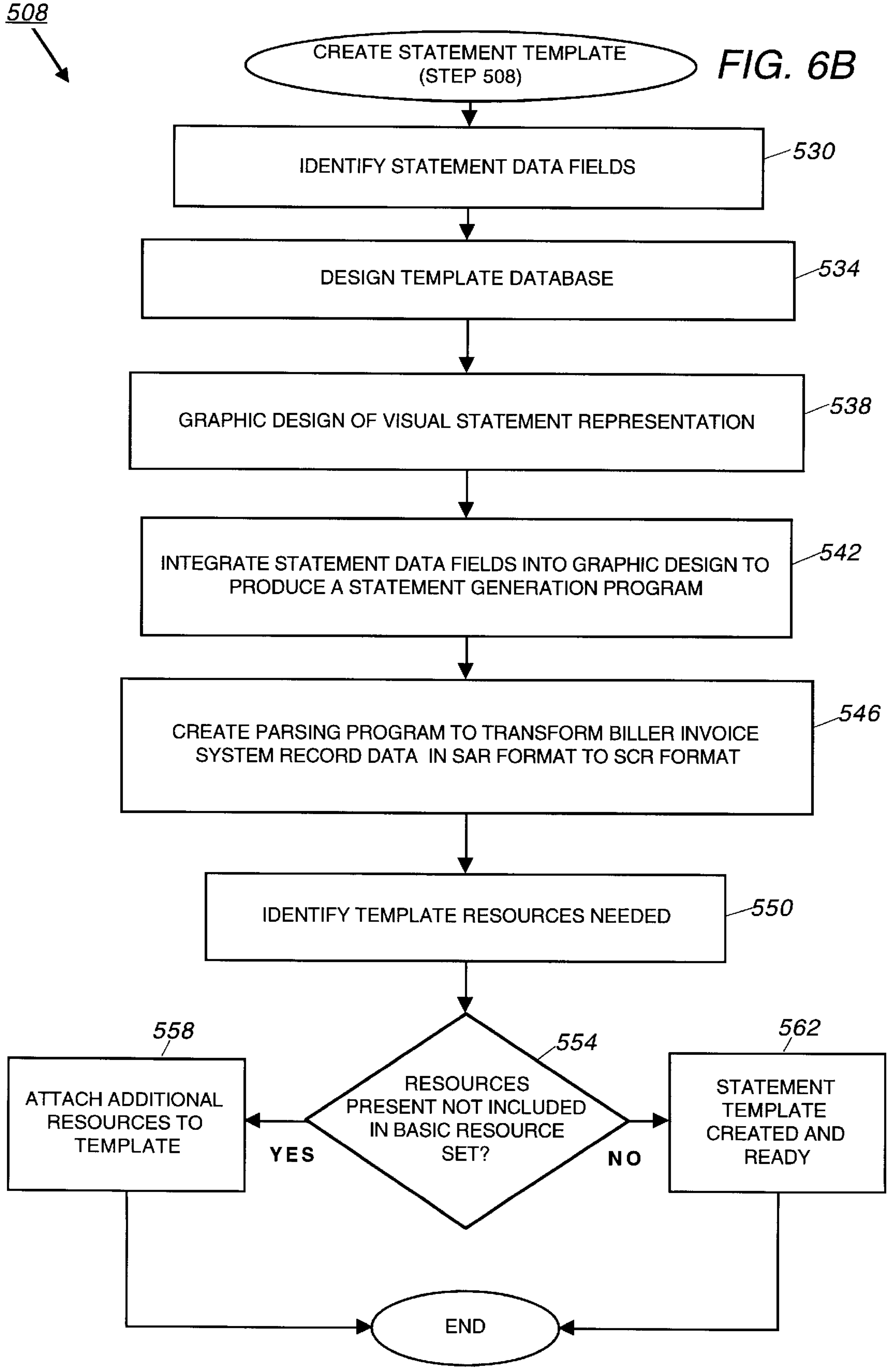
FIG. 6B is a flowchart describing one embodiment for creating a statement template.

FIG. 6B is a flowchart describing one embodiment for implementing step 508 of FIG. 6A. FIG. 6B describes how a statement template is created. Flowchart 508 will be explained with reference to FIG. 5. In one specific embodiment, a template is created at TAWS 210. However, it is contemplated that a statement template may be created on any suitable computer in any location before delivery to switch 214 or to TAWS 210. It is even contemplated that various pieces of the template may be created on different computers, assembled, and then transmitted to switch 214 (or to TAWS 210), or that switch 214 may assist in template assembly.

In step 530 the statement data fields from the biller invoicing system are identified that will be used to create the final electronic statement for the consumer. For example, data fields for an individual consumer record such as name, address, dollar amount, units used, meter readings, past history, etc., are all identified in this step. In addition to identifying the names of the data fields for use, their length, format, etc., may also be identified.

In step 534 the template database file 410 is designed. This step of database design organizes data field locations into a database so that it may be accessed by the template. A wide variety of database software may be used for this step. By way of example, the template database may be designed using a Microsoft Access database. In this specific embodiment, step 534 produces tables and relationships in an Access database that results in an output of an MDB file that represents the structure of the database but as of yet contains no data. The database design defines groupings of data such as header data and detail data, and defines relationships between such data. The data described need not be limited to data that will be printed on the eventual electronic statement, but also includes non-printed data such as demographic data that may be used by the template for choosing enclosures or otherwise used in the assembly of the electronic statements.

In step 538 the graphic design of the visual statement representation is produced. A wide variety of software tools may be used to design this representation such as Pagemaker, Corel Draw and Quark Express. This graphic design specifies where elements such as corporate logo, name, summary section, detail section, and other graphic elements will be placed upon the electronic statement.

Step 542 integrates the statement data fields identified above with the graphic design to produce a statement generation program 416. Such a statement generation program is used to produce the electronic statement. A wide variety of software tools known as report writers may be used to perform this task. By way of example, the tool known as Focus may be used. Such tools allow a user to describe the marriage of data fields and graphic elements to produce a printed report. In one specific embodiment, the report description tools available in Microsoft Access are used to write a report definition. This report definition represents the statement generation program 416 of FIG. 5 and eventually allows the printing or other rendering of-an electronic statement.

In step 546 a parsing program is created to transform biller invoicing system record data in SAR format to statement content record (SCR) format. It should be appreciated that this step may be used to transform record data of any format (including EDI 810 format) into any other suitable format for use by the ESP system. In one specific embodiment, an SCR includes elements as described in FIG. 9A. The parsing program is used to describe how data at a particular field in biller record data in SAR format may be transformed into SCR format data for later placement into a database described in database file 410. In other words, step 546 produces a parsing program that describes how to populate the table structure of database file 410 with invoicing system data records taken from the biller. The parsing program may be created in any suitable language. In one specific embodiment, Microsoft Visual Basic for Applications (VBA) has been found to produce desirable results. The output of this step produces parsing program 414 of FIG. 5.

In step 550 template resources 412 needed to produce an electronic statement are identified. Resources needed may include any fonts, graphics, logos, bitmaps, etc., needed to produce the desired electronic statement of the biller. These resources are identified in this step so that needed resources may be shipped with the template. In one embodiment of the invention, these resources are identified by analyzing the report definition created above in step 542.

In step 554 it is determined whether resources are identified in the template that are not included in the basic resource set included at each SGEN. Each SGEN used for generating electronic statements includes a basic resource set of common fonts, etc., that may be used by any arriving template. If all resources identified in step 550 are included within this basic resource set, then in step 562 the statement template is created and ready for transfer to switch 214. If, however, any identified resources are not included, then in step 558 these additional resources are attached to the template as external files. At this point control returns to step 512 of FIG. 6A.

TEMPLATE VALIDATION EXEMPLARY FLOWCHART

Figure 6C:
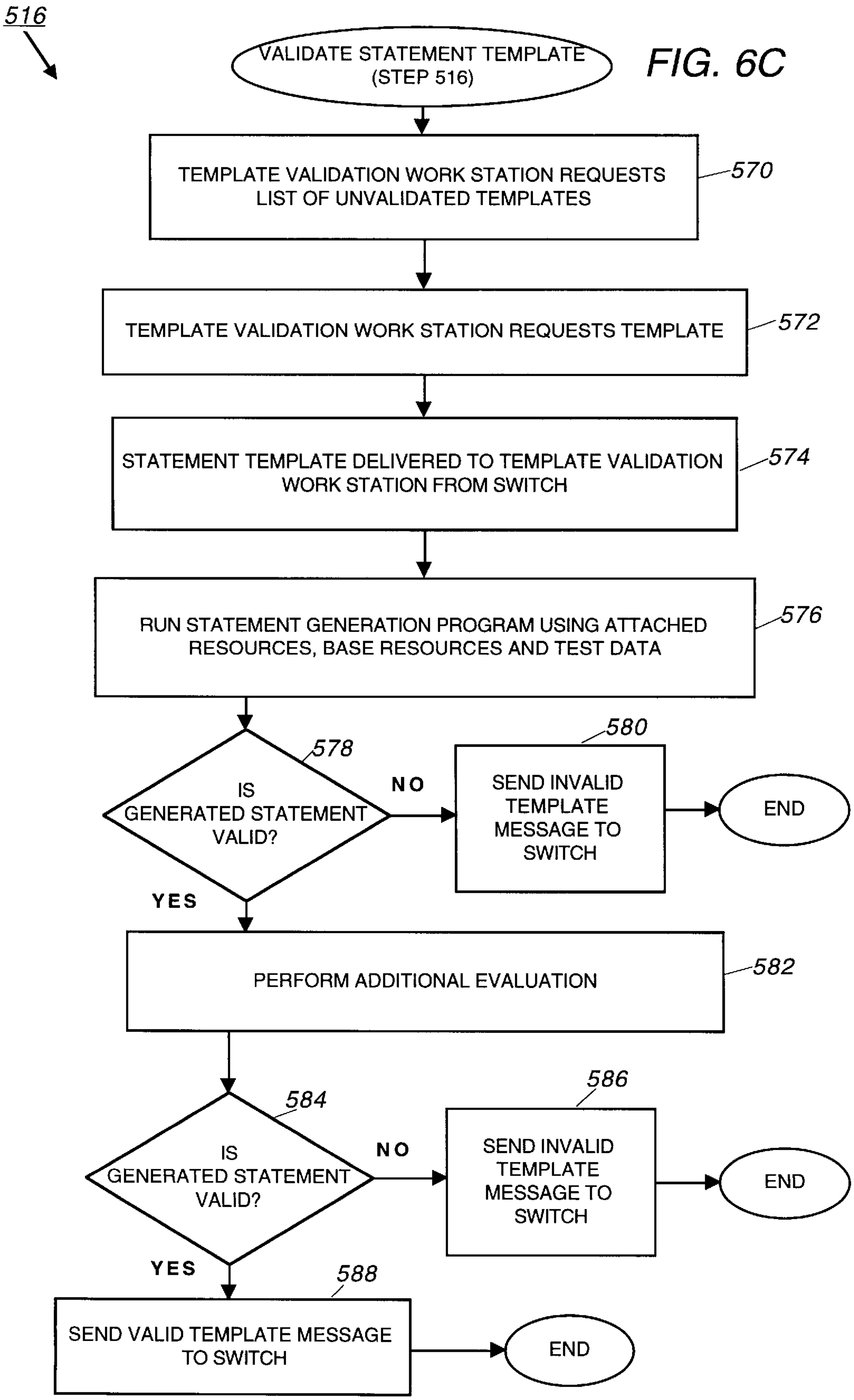
FIG. 6C is a flowchart describing one embodiment by which a statement template may be validated.

FIG. 6C is a flowchart describing one embodiment by which a statement template may be validated according to step 516 of FIG. 6A. When a template is first created, its original status is "unvalidated". In one specific embodiment, a template may not be used within the ESP system until the template has been validated. Validation helps to enforce operating rules of the ESP system and ensures quality of the final product delivered to a consumer.

In step 570, template validation workstation (TVAL) 218 requests a list of templates ready for validation. This request is sent to switch 214 which accesses template library 216 to determine which templates are awaiting validation. Switch 214 responds by sending a list of unvalidated templates to TVAL 218. In step 572, TVAL 218 reviews the list and requests a template for validation from switch 214. In step 574, switch 214 delivers the requested template to TVAL 21. In one specific embodiment, the template delivered to TVAL 218 is not returned to switch 214 to ensure the integrity of the template within template library 216. Templates returned to switch 214 run the risk of being corrupted enroute.

In step 576 TVAL 218 runs statement generation program 416 contained within the template using any attached resources 412, any base resources present at TVAL 218, and the test data present within the template. A technique for running the statement generation program to produce an electronic statement is described below in FIG. 9. In one specific embodiment, this same technique is used at SGEN 222, TVAL 218 and TAWS 210 for creating an electronic statement in order to view it or test it. The result of step 576 is an electronic statement such as a customer might see except that it is populated with test data.

Step 578 determines whether the generated electronic statement is valid. This step is a quick check to determine basically if the template has enough functionality to produce a statement without running a risk to the SGEN's processing environment. If not, then in step 580 an invalid message is returned to switch 214 and this validation process ends. If, however, the statement passes this first check, then in step 582 additional evaluation of the statement is performed. This further evaluation may include a wide variety of checks. By way of example, step 582 evaluates the generated statement for compliance with ESP system operating rules, legal requirements, aesthetics, size requirements (for speed considerations), virus scans, etc. This step may be performed by an operator or automatically depending upon the criterion.

If step 584 determines that the generated statement is not valid based upon this additional evaluation, then in step 586 an invalid message is returned to switch 214 and the validation process ends. However, if the statement is still valid, then in step 588 a valid template message is returned to switch 214. Once a template has been validated, it is ready for use within the ESP system. At this point, control returns to step 520 of FIG. 6A.

CONSUMER SERVICE PROVIDER SETUP EXEMPLARY FLOWCHART

Figure 7:
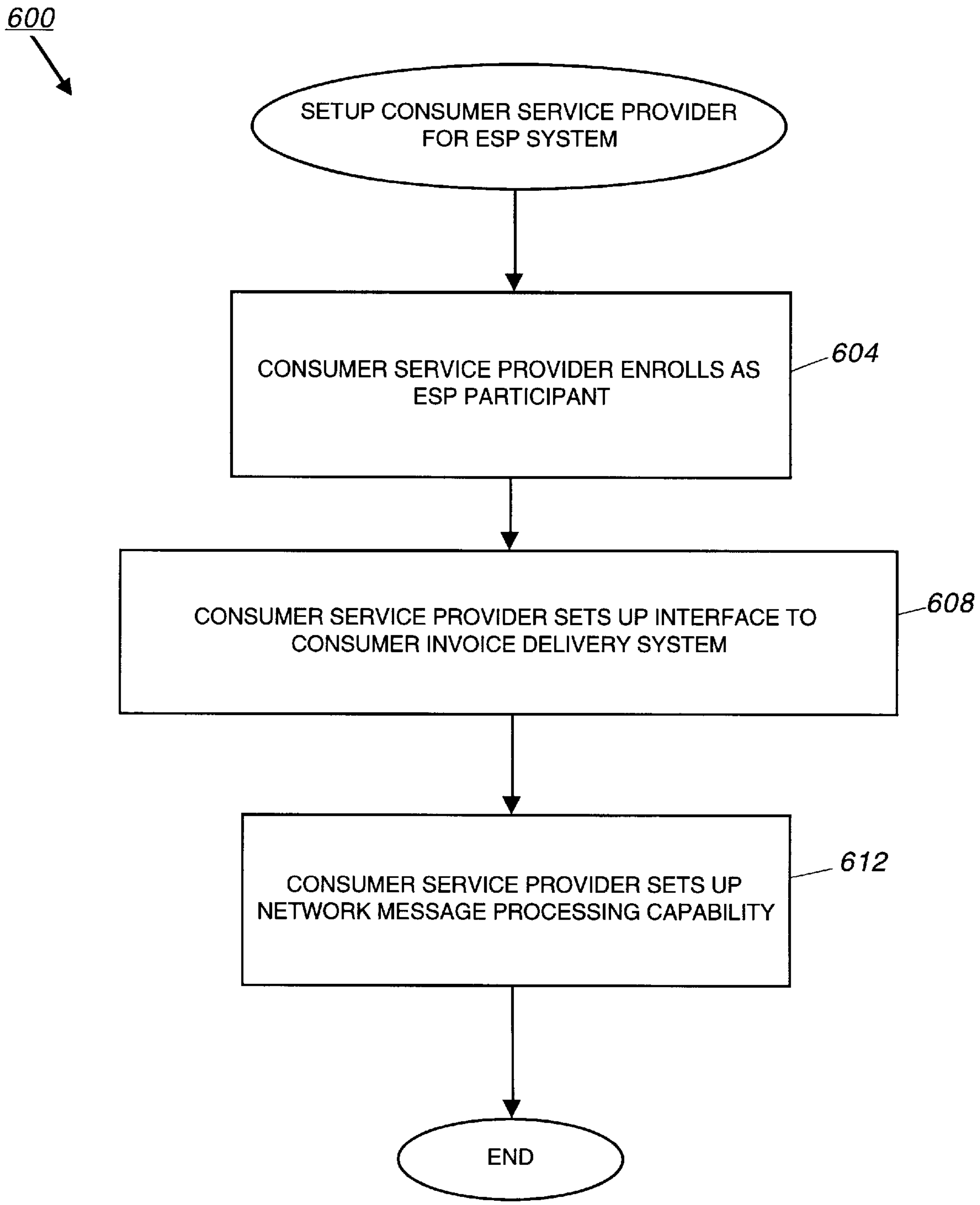
FIG. 7 is a flowchart describing one embodiment by which a consumer service provider (CSP) is set up for operation within the ESP system.

FIG. 7 is a flowchart 600 describing one embodiment by which a consumer service provider (CSP) is set up for operation within ESP system 200. For simplicity, CSP will be used herein below to represent a consumer financial institution or any other consumer service provider. In step 604 the CSP enrolls as an ESP participant. Similar to step 504, in this step the CSP provides a variety of information to the coordinating entity to identify the CSP and to provide points of contact. In particular, the CSP is assigned an end point, including a CSP identifier and a network mail address. The CSP is also provided with a list of templates of participating billers in the ESP system so that it may advertise these billers to its customers. A set of biller logos are also provided to the CSP for display by their home banking software, or may be found by reference to UBF 300.

In step 608, the CSP sets up an interface between the ESP system and its own consumer statement delivery system. As explained above, once an electronic statement or invoice is received by the CSP, it is the responsibility of the CSP to present this electronic statement to its customers over its medium of choice. In one specific embodiment, an interface is provided that allows an electronic statement in a PDF or EDI format to be delivered to a consumer over the medium that the CSP chooses. The remote mail station at the CSP (or SGEN 222) receives the electronic statements, the CSP builds hardware/software infrastructure in order to take these electronic statements and make them available to its customers. Preferably, ESP system 200 is capable of integration with personal computers, screen telephones, PDAs, WebTV applications, touch tone telephones, etc., that may be used by customers of a CSP. In one specific embodiment, the CSP interface to the consumer provides a window of at least 640×480 pixels for viewing a PDF file.

In step 612, the CSP sets up its network message processing capability. As described above, the CSP sets up its ability to handle the format of messages used within the ESP system. In one specific embodiment, the CSP sets up a capability to handle the ADV messages described in Table A. Similar to the messages of step 524 that a biller implements, the CSP in step 612 enables itself to send and receive the compliment of those messages. A CSP may also send and receive messages to and from the coordinating entity. By way of example, a CSP may request a delivery of all new template announcements, request delivery of any historical statements no longer on hand, provide statement delivery notification messages and subscription list management messages. After step 612, the CSP has been set up for participation in the ESP system.

CONSUMER ENROLLMENT EXEMPLARY FLOWCHART

Figure 8:
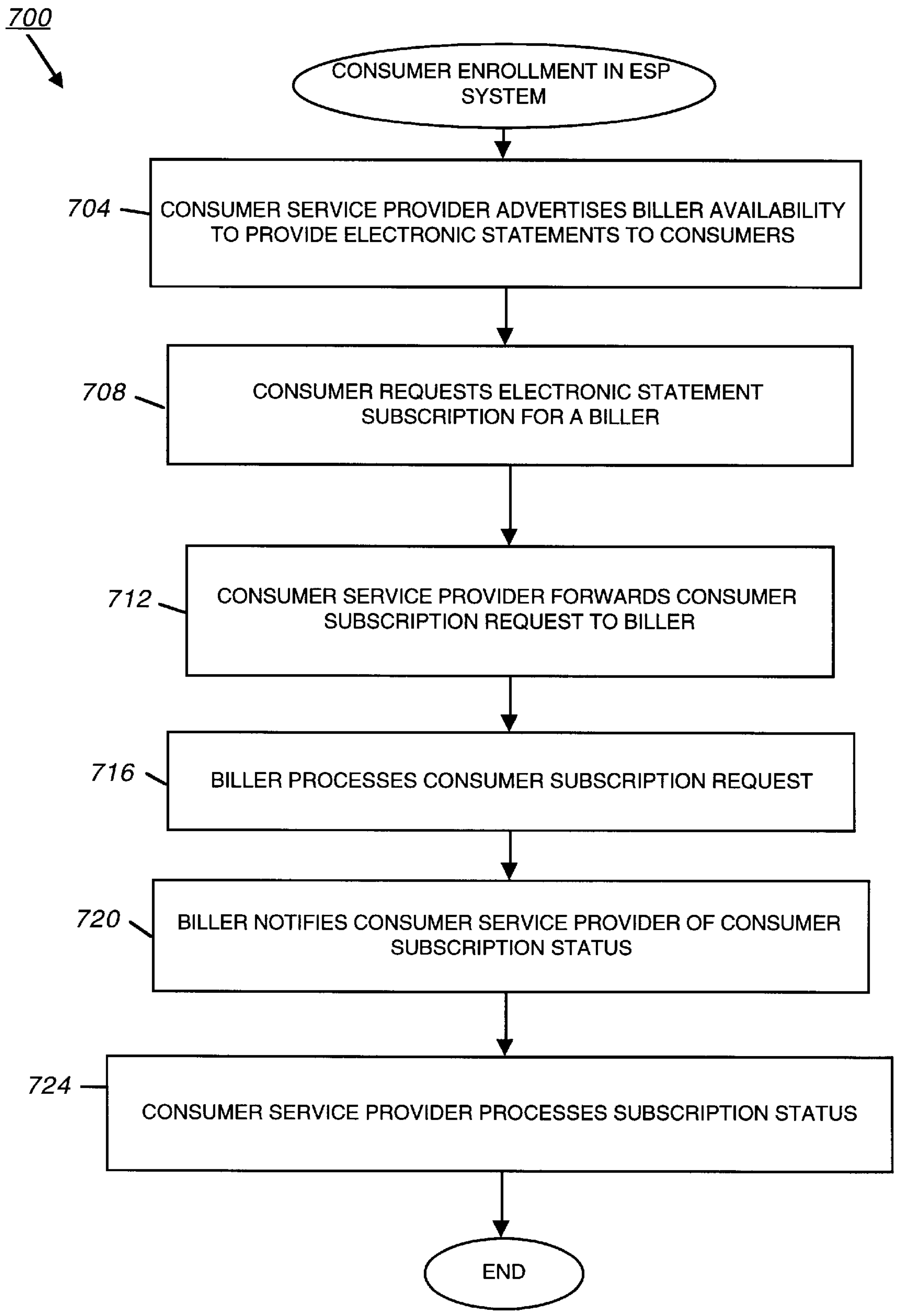
FIG. 8 is a flowchart describing one embodiment by which a consumer enrolls in the ESP system.

FIG. 8 is a flowchart 700 describing one embodiment by which a consumer enrolls in the ESP system. In other words, FIG. 8 provides one technique by which a consumer may subscribe to the ESP service. An available subscription is equivalent to the identification of an in-service template, and a subscription may be viewed as a unique relationship between a template identifier and a customer's biller account number (CBAN). Once a subscription has been confirmed, a billing relationship is established between a consumer and a biller. Although a single person may be responsible for multiple CBANs, in a preferred embodiment, a consumer is associated one-to-one with a CBAN, and that single person conceivably could be paying bills for multiple consumers. During the course of a billing relationship, a customer may have a series of subscriptions due to starting and stopping ESP service, or to changing templates or CBANs. While a given subscription exists, either the biller or the customer may propose changes. Changes to subscription characteristics other than the template and CBAN may be made to the existing subscription; however, changes to the template or CBAN may define a new subscription.

Each biller may have multiple templates, a consumer being subscribed to a particular template. It is contemplated that a single consumer may also subscribe to multiple templates for different services received from a biller. Once a subscription has been requested and confirmed, either party may propose changing the terms, or replacing one subscription with another, but in a preferred embodiment changes are only effective when confirmed by the recipient. Either party may be allowed to unilaterally terminate a subscription; however, in a preferred embodiment, unless the termination is confirmed or acknowledged, the ESP system generates an error message. A biller may also propose an additional subscription to a consumer having a current subscription with the biller. The CBAN may be the same as the initial subscription, but preferably a different template would be used.

An existing subscription may be replaced by terminating the existing subscription and initiating a new subscription. This situation may occur when either consumers or billers wish to change templates, or when a biller unilaterally changes a consumer's account number. Subscription requests may originate either with the consumer or the biller, and may concern adding a new subscription, changing the terms of an existing subscription, replacing an existing subscription, adding a second subscription, or terminating a subscription.

To begin enrollment, in step 704 the CSP advertises biller availability in providing electronic statements to consumers. This advertisement may take place in any of a variety of media that the CSP uses to communicate with its customers such as over the Internet, electronic mail, regular mail, telephone, newspaper advertisements, etc. A CSP learns of biller availability from switch 214. When a statement is validated by TVAL 218, a statement available notification message is sent by switch 214 to all CSPs notifying them of the availability of a new biller and/or a new template from a biller. Alternatively, a CSP may request a list of available billers and templates from switch 214 which is produced from template library 216. Step 704 may use a biller's logo defined as part of the template or obtained from UBF 300 to advertise biller availability. A CSP may also advertise the availability of a variety of templates from a biller if applicable.

In step 708, a consumer requests an electronic statement subscription for a biller. This request may take place through the same medium by which the CSP has advertised to the consumer. In this step, the consumer may choose not only a biller, but also a particular template from a biller if the biller offers a choice of templates. In step 712 the CSP forwards the consumer subscription request to the biller. In one specific embodiment, this request is forwarded through switch 214. For consumer initiated requests, the CSP at this point may also confirm that the biller and/or template requested by the customer is available within the ESP system by reference to a list of available templates. The CSP may determine this information by reference to UBF 300 and template library 216.

Alternatively, the CSP may forward a request to a biller outside of switch 214 via any suitable medium such as Internet, electronic mail, regular mail, telephone, computer network, etc. Included in the subscription request is the customer name, the CBAN, a CSP assigned subscription number, a CSP account number for the customer, and any other information useful to the CSP or to the biller. The CSP may also fill in much of the data needed for a request on their customer's behalf. For example, name and address information may be copied from the CSP's records. The CSP may also do limited validation of the request such as by comparing the customer's account number to an account mask that may be obtained from UBF 300. SORG 208 retains a variety of information for later use when a subscription request is forwarded to switch 214 through SORG 208 to biller 102. In particular, SORG 208 retains the CSP identifier, the CBAN, the CSP account number, biller identifier, template identifier, etc.

In addition to a CSP advertising biller availability, a biller may advertise directly to consumers its capability of providing electronic statements. In such a solicitation, a biller would provide an indication of who the CSP is for a particular consumer, including a CSP identifier and the CSP account number for the customer. In addition, as an alternative to steps 708 and 712, a consumer may communicate directly with a biller providing the required information necessary to begin a subscription.

In step 716 the biller processes the consumer subscription request. In this step, the biller modifies its invoicing system to indicate that for this consumer no more paper statements are desired. The invoicing system is modified to reflect that the consumer desires electronic statements with a particular template. In step 720 the biller notifies the CSP of the consumer subscription status. A variety of responses from the biller are possible. By way of example, the biller may reject the subscription, may accept the subscription or may accept conditionally based upon questions needing to be answered. For example, the biller may need to know the maiden name of the consumer's mother. In one specific embodiment, the biller notifies the CSP using switch 214. Alternatively, a biller may notify a CSP through any of a variety of media.

In step 724 the CSP processes the subscription status. For example, if the subscription is rejected, the CSP will notify the consumer. Similarly, the CSP may also notify the consumer if the request has been accepted or if questions need to be answered.

FIG. 8 presents one particular embodiment for enrolling a customer; it should be appreciated that other similar techniques may be used. For example, subscriptions may be facilitated for consumers already using an electronic bill payment system. As these consumers are already authenticated and have information within the system, the subscription process may be made as simple as possible. A CSP simplifies subscription to the ESP system by an existing electronic bill payment customer by automatically filling out a form containing data needed for the subscription request. Once delivered to a customer, the customer may simply click an OK button to submit the request. A CSP may even present this data in a grid that would permit existing electronic bill payment customers to submit multiple requests for subscriptions with a single click. Advantageously, the operating mode and design of forms used to solicit subscription information from customers use is at the CSP's discretion. In this fashion, a CSP may improve upon existing relationships with its customers.

ELECTRONIC STATEMENT PRESENTMENT EXEMPLARY FLOWCHART

Figure 9A:
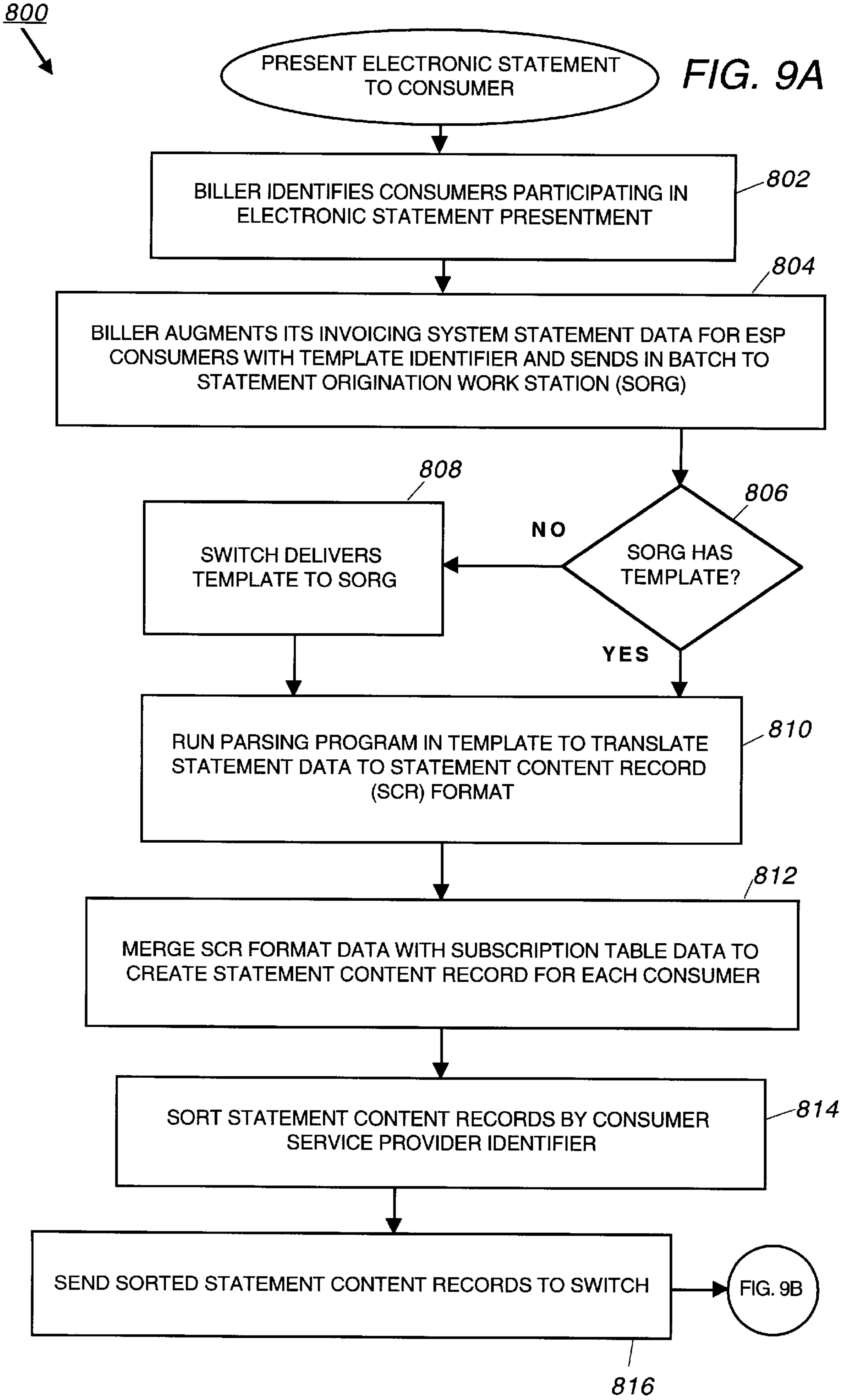
FIGS. 9A and 9B are a flowchart describing one embodiment of the present invention by which an electronic statement is presented to a consumer.
Figure 9B:
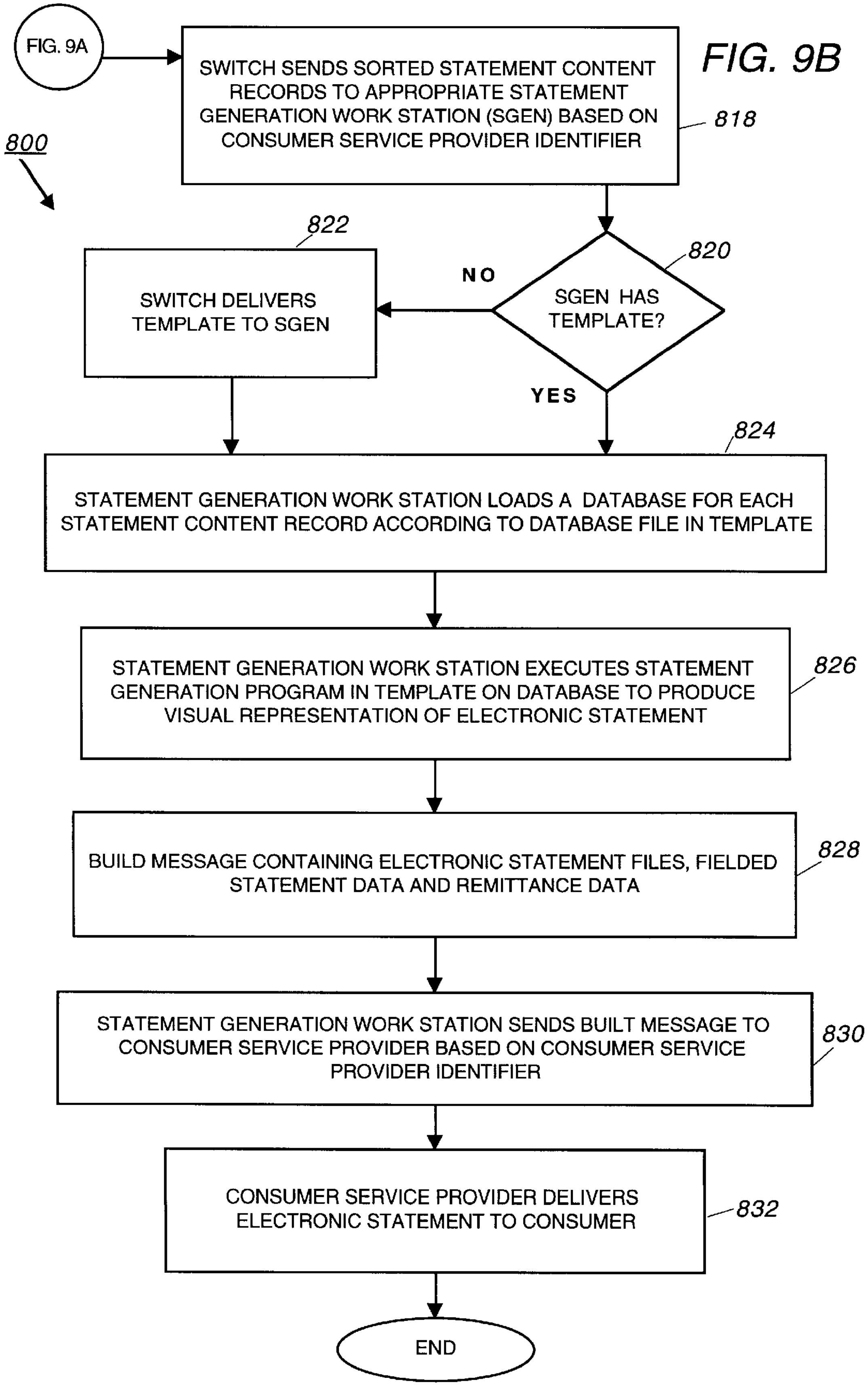

FIGS. 9A and 9B are a flowchart 800 describing one embodiment of the present invention in which an electronic statement is presented to a consumer.

This process uses the following data structures to implement this embodiment of the invention. It should be appreciated that other data structure may be used and/or these may appear in different forms. A statement augmented record (SAR) is sent from the biller to SORG 208 and includes for each consumer record the customer name, customer address, statement data and consumer's biller account number (CBAN). A subscription table located in SORG 208 exists for each consumer and includes the customer identifier, a template identifier, an SGEN identifier, the CBAN and other suitable information. As described above in step 712, SORG 208 builds this table by checking subscription messages from consumers as they travel to the biller. Alternatively, the template identifier, the SGEN identifier, or both may be included with the SAR sent from the biller. A statement content record (SCR) is formed from a union of the SAR and subscription table and includes the SGEN identifier, template identifier and version number, and statement data (including CBAN) in a standard form expected by statement generation program 416. Other information able to identify a particular CSP or customer of a CSP may also be included within the SAR, the subscription table or the SCR.

For a given day of the month, typically a biller is processing a billing cycle to deliver statement or invoices to its consumers. For each billing cycle, a biller first identifies which consumers will be receiving statements or invoices in that cycle. Next, in step 802, the biller identifies those consumers who are participating in electronic statement presentment. In one specific embodiment, the biller identifies these ESP consumers by a flag in its invoicing system database indicating that the consumer has submitted a valid subscription request for an electronic statement.

In step 804, for these identified consumers, the biller augments its invoicing system statement data to be delivered to these consumers with a template identifier and version. The template identifier indicates with which biller template the biller desires the statement data for these consumers to be combined. Once augmented, these records of consumer statement data are termed statement augmented records (SAR). The biller then sends in batch these statement augmented records to its associated statement origination workstation (SORG). SORG 208 may be located at the biller in which case the batch data is transferred locally. For those billers not having an SORG, the batch data is transmitted via a remote mail station as described above.

Step 806 determines whether SORG 208 has the template identified in the batch (of the correct version, if any). If not, it requests the template using the template identifier from switch 214, and in step 808 the switch delivers the identified template (of the correct version, if any) to SORG 208. In step 810 parsing program 414 contained in the template is run to translate the SAR data into SCR format. In step 812, the SCR format data is merged with subscription table data for each consumer to create a statement content record (SCR) containing data for each consumer. The statement content record is in a standard form expected by the ESP system and by the template.

Step 814 sorts all of the statement content records that have been received in one batch from the biller into new batches that are sorted by SGEN identifier. Thus, each new batch is now grouped based on to which SGEN it should be sent. For those CSPs that have an SGEN located on the premises, this SGEN identifier also serves as a CSP identifier. Other information may be included in a statement content record to identify a particular CSP. In step 816, these batches of sorted statement content records are sent to switch 214. In one specific embodiment, these batches are sent in separate messages.

In one specific embodiment of the present invention, a physical SGEN located centrally includes any number of logical SGENs. Each logical SGEN corresponds to the CSP to which the batch will be sent. In this embodiment, the SGEN identifier sent along with a batch of records identifies the logical SGEN within the physical SGEN and inherently the appropriate CSP. In this fashion, batches of records sorted by SGEN identifier are routed to the appropriate physical SGEN and then on to the appropriate CSP. In this embodiment where an SGEN is located centrally and a CSP has a remote mail station, the SGEN identifier (corresponding to a particular CSP) is mapped to a remote mail station identifier to enable the data to be sent to the correct CSP.

At this point, switch 214 has received numerous batches of consumer records sorted by SGEN identifier that have all originally come from one biller utilizing one particular template. However, switch 214 is also receiving batches of consumer records from a multitude of other SORGs within ESP system 200 that are connected to other billers. In step 818 switch 214 sends these batches of sorted statement content records to appropriate SGENs 222 based upon the SGEN identifier associated with each batch. At any given point in time, switch 214 is switching a multitude of batches of consumer records that have been received from a variety of billers and will be switched to an appropriate SGEN 222 based upon the SGEN identifier associated with each batch. Thus, although many batches of consumer records received by the switch may have originated from a single biller using one particular template, by the time the switch has received consumer records from many other billers, it may be sending numerous batches of consumer records to a single SGEN 222 that all may require different templates. By the same token, switch 214 is also routing these batches of consumer records to numerous SGENs 222 within the ESP system depending upon the SGEN identifier. Alternatively, a unique CSP identifier for each CSP may also be used to route batches of consumer records.

Step 820 determines whether SGEN 222 has the template identified by the batch of statement content records. If not, SGEN 222 requests this template from the switch and the switch delivers the template to SGEN 222 in step 822. In step 824 SGEN 222 loads and creates a separate database record for each statement content record according to database file 410 in the template. Thus, the structure of database file 410 created when the template was created at TAWS 210 is used to load a database from the statement content record for each consumer.

In step 826 SGEN 222 executes statement generation program 416 of the template on the newly created database to produce a visual representation of the electronic statement for a particular consumer. The electronic statement generated may be represented in one file or in numerous files in any data format desired. By way of example, the electronic statement is represented in multiple PDF files. In one specific embodiment, if an electronic statement for a consumer contains a summary section, a detailed section and numerous enclosures, the electronic statement would be represented by one PDF file for each section and for each enclosure. Other data formats may be provided, such as the EDI 810 format. A PDF file may be produced by SGEN 222 in different manners. In one specific embodiment, a Microsoft Access report writer program is used to produce a Postscript file. This postscript file is then run through the Adobe Distiller program to produce a PDF file.

In step 828 SGEN 222 builds a message containing these electronic statement files, fielded statement data and remittance data. Fielded statement data is a duplicate of the statement data for the consumer contained within the electronic statement except it is in numeric form accessible by a non-conforming consumer device, and not represented in a graphical form as in the electronic statement. In this manner, consumers with non-conforming devices such as voice telephones, personal digital assistants, screen telephones, etc., are still able to receive the basic statement data informing them of a bill that may be due. Remittance data is that information typically found on a remittance coupon in an invoice from a biller. With a paper invoice, typically the remittance coupon is returned to the biller along with a check so that the biller knows who has paid what, and in what amount. The remittance data typically includes the biller identification, the CBAN, and biller reference data such as amount due, date due, etc. This remittance data may be used, for example, should consumer 140 wish to take advantage of an electronic bill payment system and submit a payment 230 to CFI 130 so that payment information 232 may eventually be transmitted back to biller 102 through any suitable electronic bill payment system.

In step 830 SGEN 222 sends this build message to the appropriate CSP based upon the CSP identifier. In step 832, once the CSP has received a message containing an electronic statement for a particular consumer, it delivers this electronic statement to the consumer using any suitable medium that it has arranged for communication to the consumer. Once the CSP has verified that the consumer has received or accessed the electronic statement, the CSP sends a delivery notification message back to the biller. Thus, during a billing cycle a biller is able to present electronic statements to those consumers wishing to receive them. Advantageously, those consumers also wishing to participate in an electronic bill payment system may then easily submit their payment along with remittance data to there CSP who forwards the payment and remittance data on to the biller.

ELECTRONIC STATEMENT EXAMPLES

FIG. 10 illustrates a detailed electronic statement 840 according to one embodiment of the present invention such as may be displayed on a conforming consumer delivery device. For example, such a statement may be displayed from a CSP to a consumer via the Internet, electronic mail, television, personal digital assistant, a capable screen telephone, etc. In this example, electronic statement 840 is an invoice from a power company. Invoice 840 includes biller's name 841, customer's biller account number (CBAN) 842, customer name and address 843, a listing of current and previous charges 844, an explanation of current charges 845 and a biller return address 846. In addition, invoice 840 includes additional detail and graphics including a logo 847, a graph 848 showing a comparison of present and previous monthly electricity use, an energy conservation message 849, and enclosure advertisements 850 and 851. Invoice 840 may contain such detail as allows a biller to replace the biller's traditional mail paper invoice with electronic invoice 840.

Detailed invoice 840 includes static information from the biller's template and dynamic current invoice data for the particular customer listed. Static items from the biller's invoice template include biller name 841, return address 846, and logo 847. In addition, the locations for the dynamic data including their headings and/or identifiers are also included in the invoice template. Of the remaining items, customer biller account number 842, customer name and address 843, current and previous charges 844, explanation of current charges 845, and detailed history of energy usage

848 constitute the dynamic invoice data for this particular customer. Energy conservation message 849 and advertisements 850 and 851 may each constitute static invoice data or dynamic current invoice data, depending on whether an item is included in all customer invoices (in which case the item is static data and included with the template) or whether an item is specifically selected for the customer, for example based on the customer's demographics (in which case the item constitutes dynamic current invoice data). Static invoice data is changed by the biller by updating the biller's invoice template at TAWS 210 and transmitting a new template 212 to switch 214.

FIGS. 11–16 are screen shots from an Internet site illustrating an electronic banking world wide web application that includes the ability for electronic statement presentment. Such an Internet site is one medium by which a CFI or CSP communicates with its customers and delivers an electronic statement. Through such a site, a customer may also pay an invoice electronically if the CSP or CFI is also participating in an electronic bill payment system.

Figure 11:
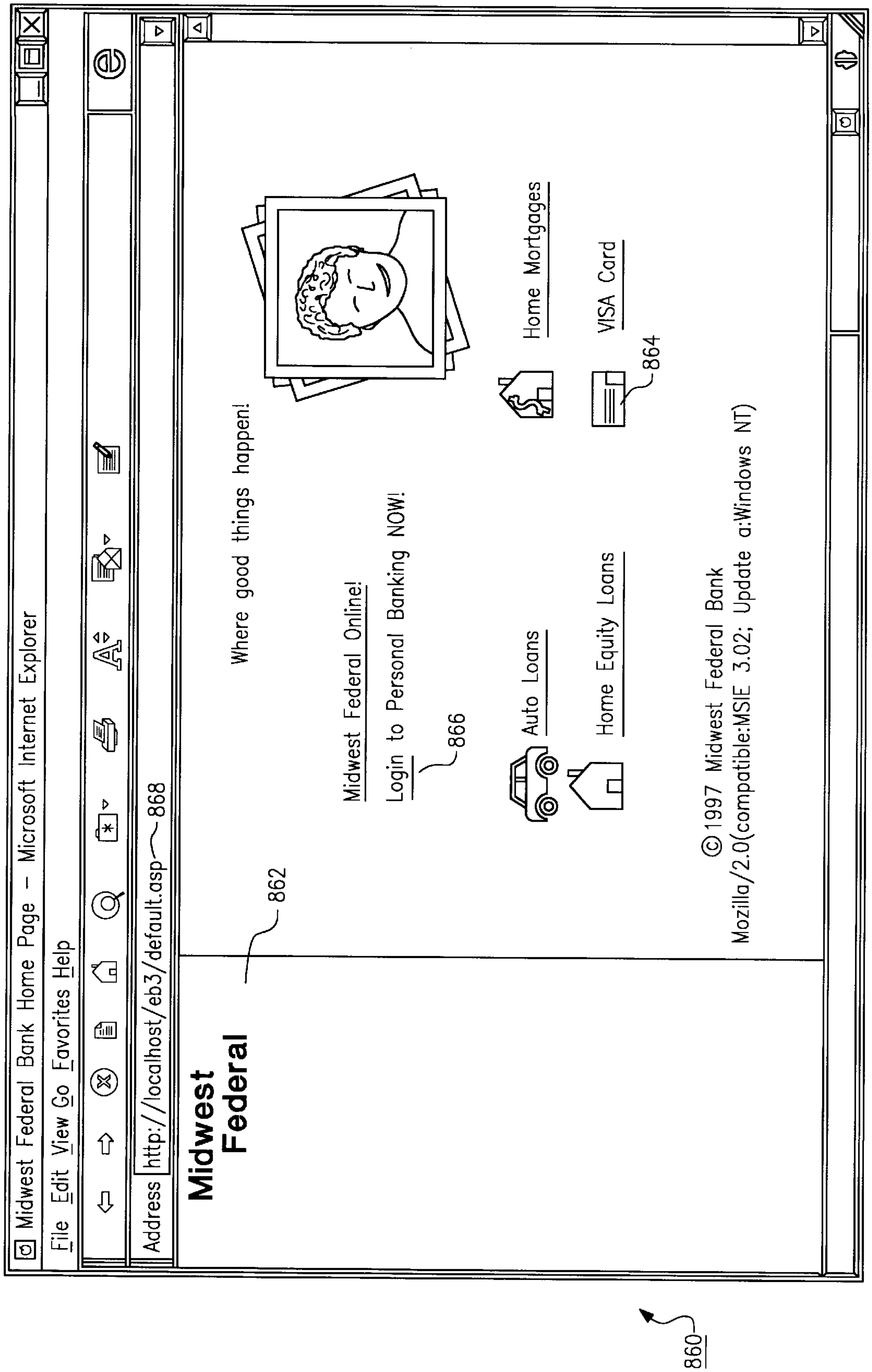
FIG. 11 is a welcome screen from an Internet site illustrating an electronic banking world wide web application that includes the ability for electronic statement presentment.

FIG. 11 is typical welcome screen 860 that would be presented to the customer upon initial connection. In this sample, the fictitious Midwest Federal Bank 862 is the CFI/CSP hosting the electronic banking service, and the fictitious Great Northern Bank Visa 864 is a biller participating in electronic statement presentation that desires to transmit its electronic statements and/or invoices to customers of Midwest Federal. After clicking the login hot spot 866, the customer would be challenged for identification. Although not shown, in a login screen the customer might be asked to supply a user name, a code number or other authentication. In this sample, the Internet site is being viewed via a Microsoft Internet Explorer Browser. All of the screen above address line 868 belongs to the browser. Material below address line 868 (in this example) is an HTML page generated by the electronic banking service web server.

Figure 12:
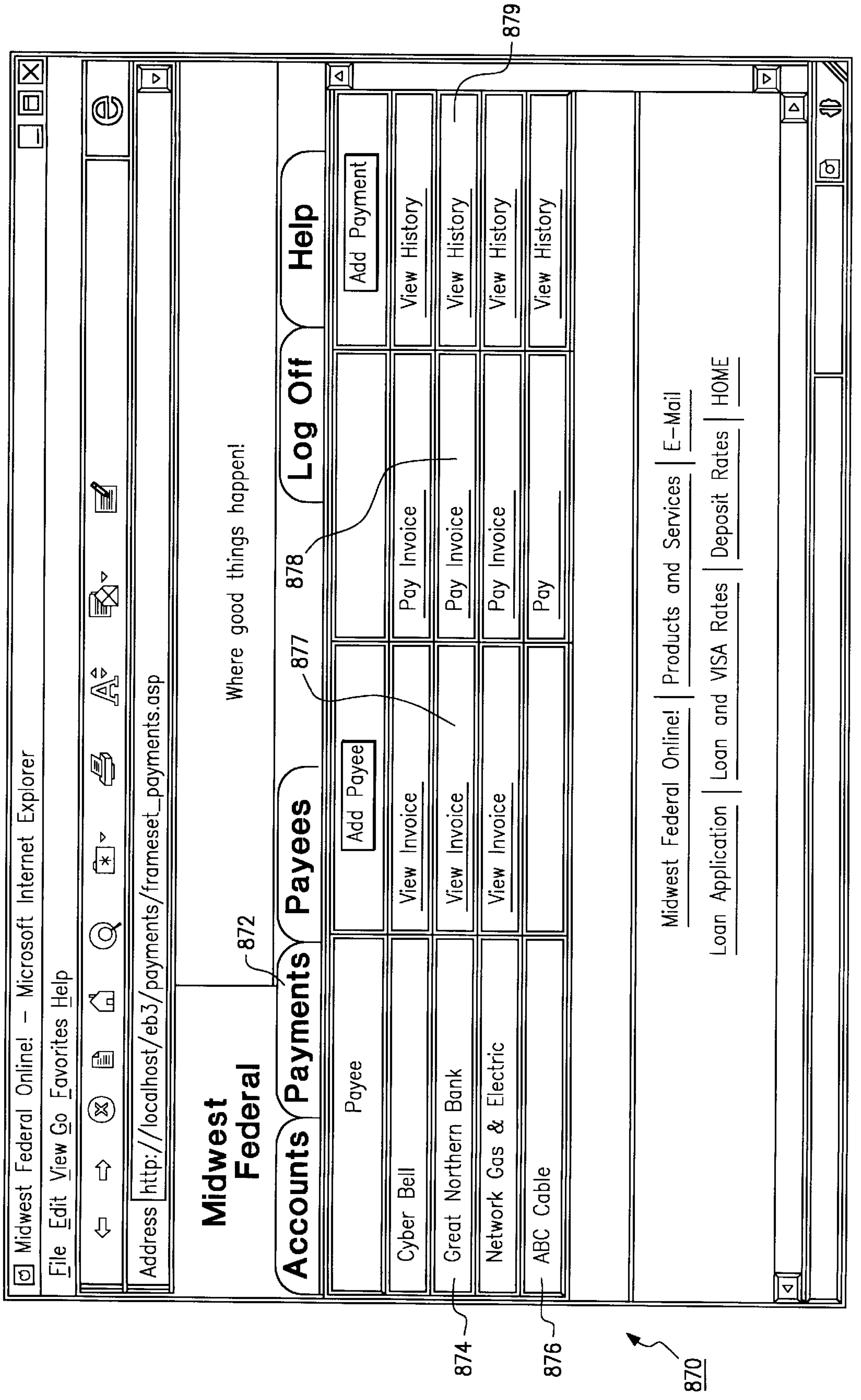
FIG. 12 is sample list of invoices screen available from the Internet site.

FIG. 12 is sample list of invoices screen 870 available from the web server. Screen 870 is displayed after a customer has logged on to the system and has selected payments tab 872. Tab 872 causes a list of subscriptions to be displayed, including a subscription for Great Northern Bank 874 and ABC Cable 876. Subscription 874 for Great Northern Bank includes a button 877 to view the current invoice that has been delivered to the customer via the electronic statement presentment system, a button 878 to pay the invoice via an electronic bill payment system, and a view history button 879 allowing the customer to view historical invoices or payments. Note that ABC cable 876 is not participating within the ESP system and as such there is no option to view an electronic statement or invoice. ABC does participate in an electronic bill payment system, however, since the pay option does appear. Using the option buttons for any subscription line, such as for subscription 874, the customer has the option of going directly to a payment screen, or of viewing an invoice. Clicking on view invoice button 877 takes the consumer to an invoice such as is illustrated in FIG. 13.

Figure 13:
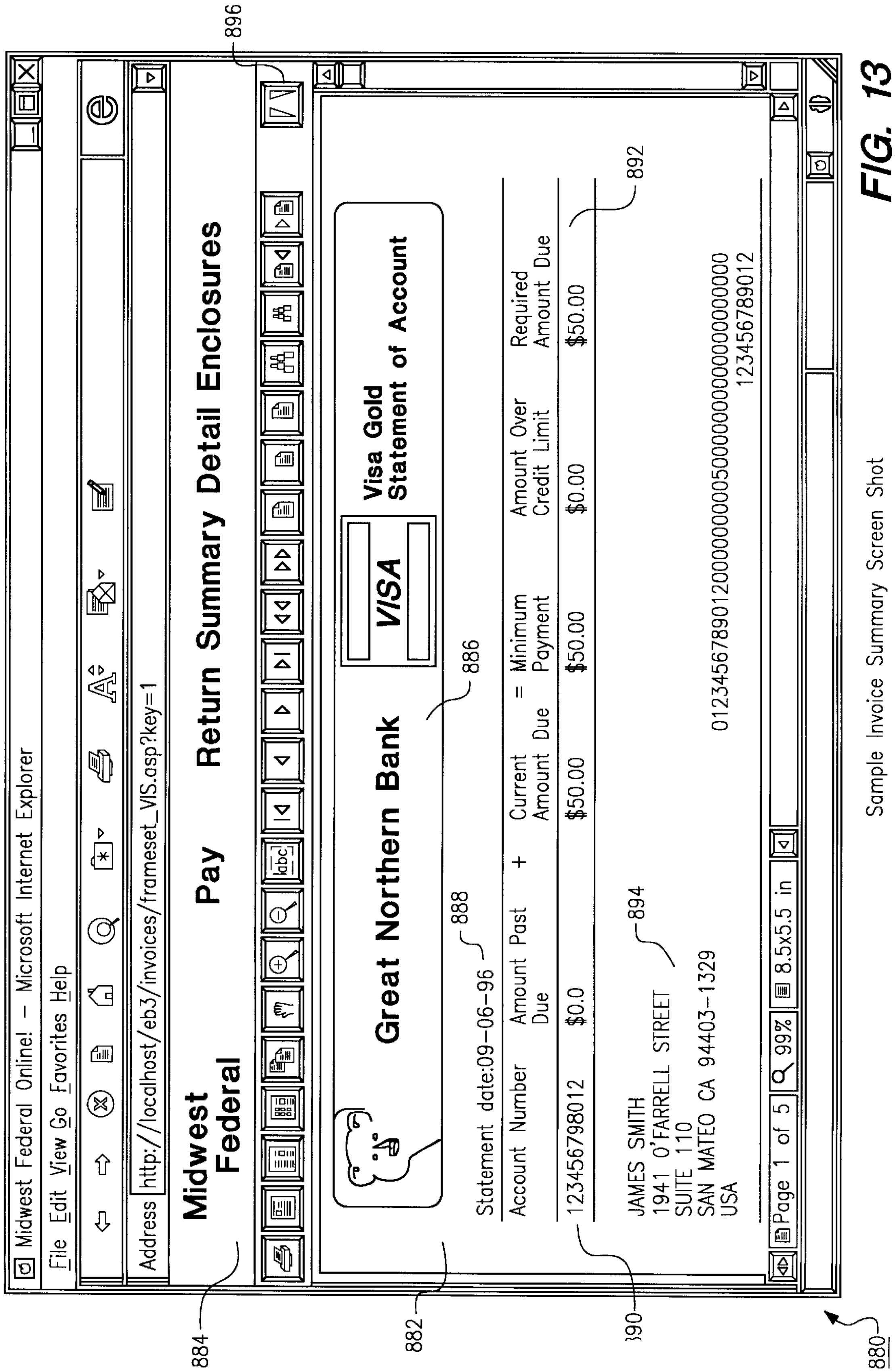
FIG. 13 is a sample invoice summary screen available from the Internet site.

FIG. 13 is a sample invoice summary screen 880. Screen 880 appears after the customer clicks on view invoice button 877 for Great Northern Bank. Summary invoice 882 is shown below a band of HTML 884 generated by the electronic banking server. HTML band 884 includes the Midwest Federal logo and five action hot spots: a pay button, a return button, a summary button, a detail button and an enclosures button. The return button takes the customer to a payment screen; the detail and enclosures buttons take the customer to other screens illustrated in FIGS. 14 and 15. Summary invoice 882 itself appears within a window that contains an Adobe Acrobat reader browser plug-in. Included is an Acrobat Reader tool bar 896 used to navigate within a PDF file as displayed within the Reader. Summary invoice 882 includes a biller logo 886, a statement date 888, a customer biller account number 890, an amount due 892, and customer name and address 894.

Figure 14:
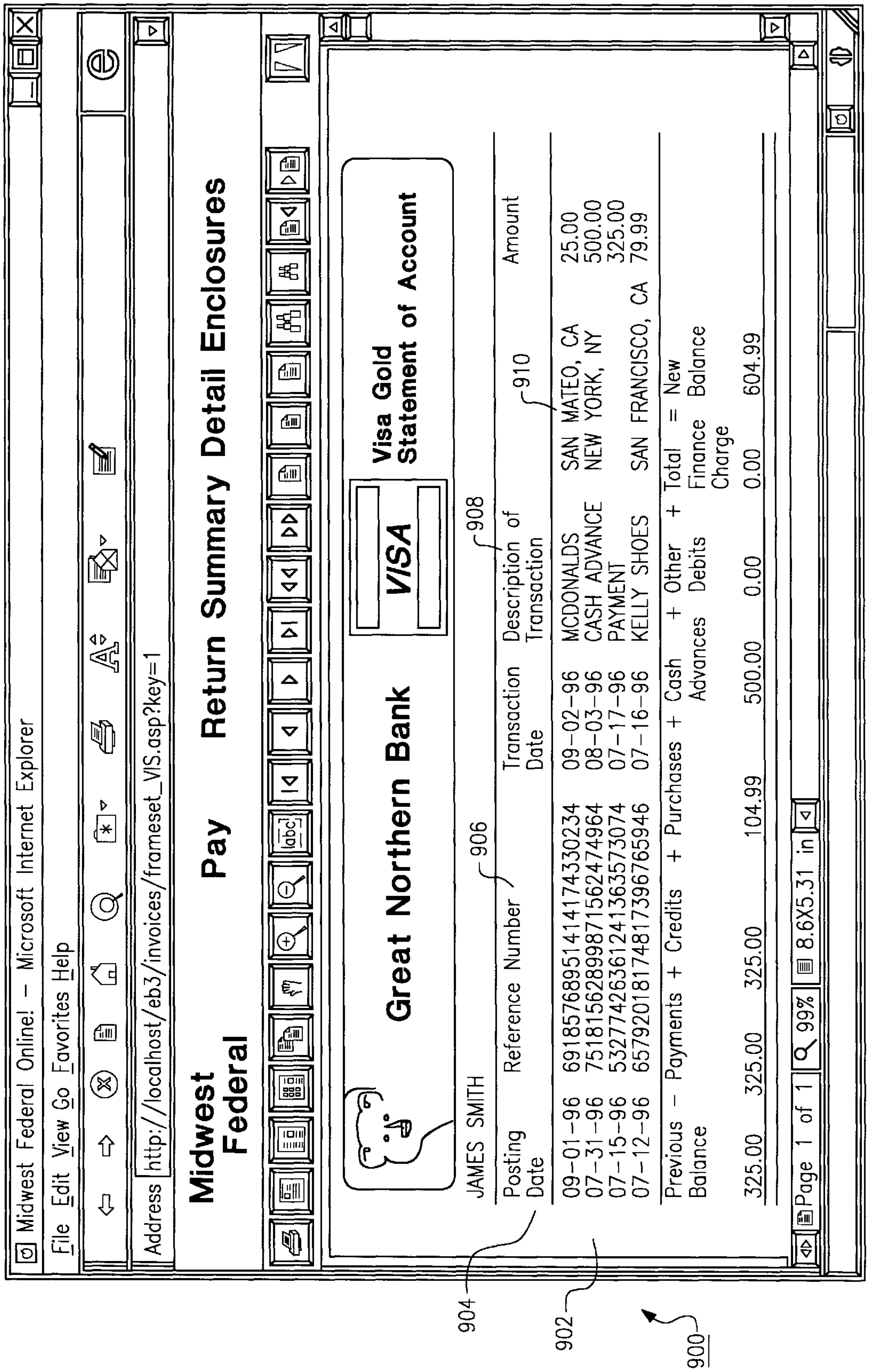
FIG. 14 is a sample invoice detail screen available from the Internet site.

FIG. 14 is a sample invoice detail screen 900 that is displayed when the customer clicks on the detail button within band 884 of FIG. 13. Invoice detail 902 is shown within the Acrobat Reader window. Invoice detail 902 includes a posting date 904 for each transaction, a reference number 906 for each transaction, a description of each transaction 908, a location 910 and other detailed information.

Figure 15:
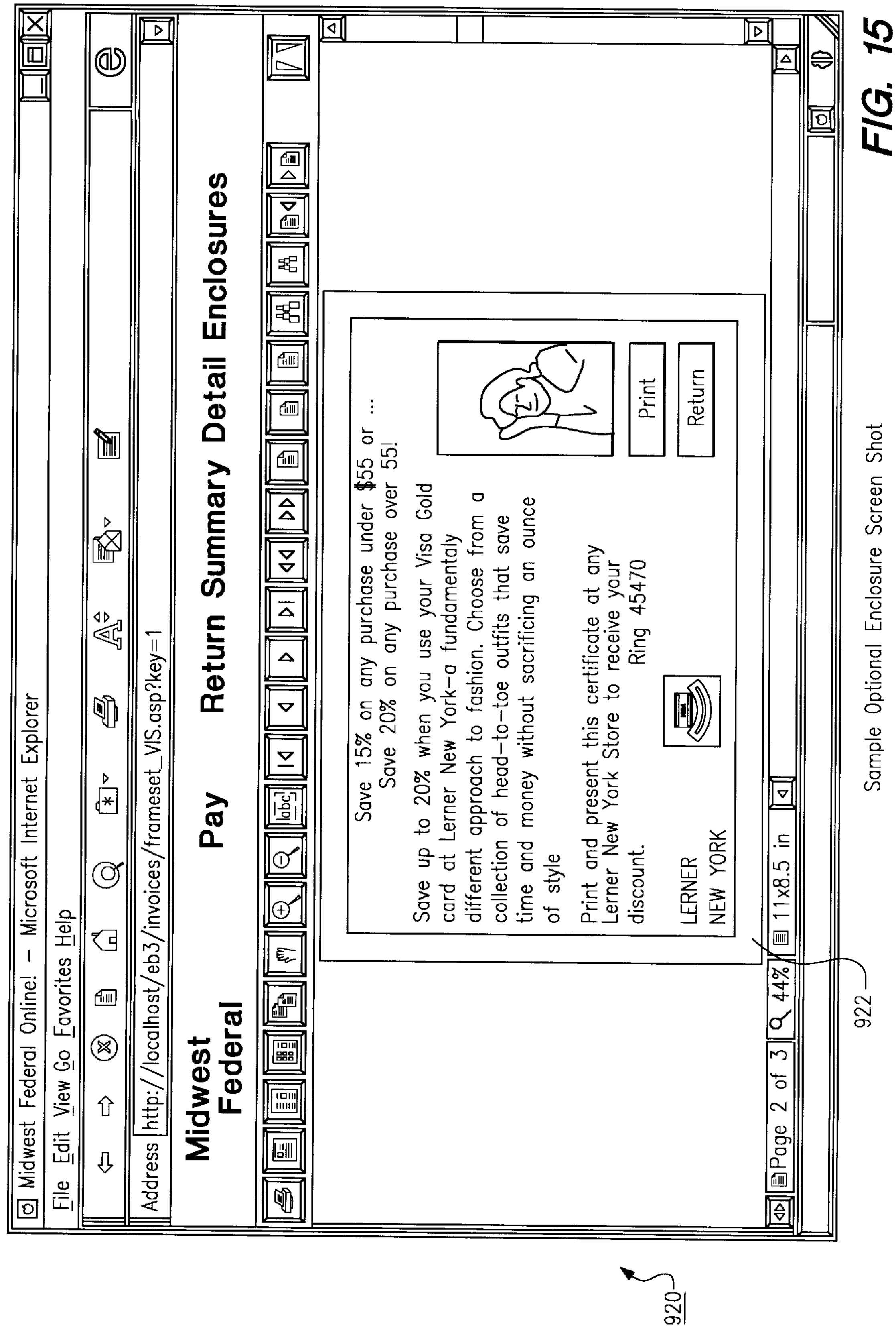
FIG. 15 is a sample enclosure screen available from the Internet site.

FIG. 15 is a sample enclosure screen 920 that is displayed when the customer clicks on the enclosures button in band 884. Enclosure 922 is an advertisement from a retailer wishing to advertise in conjunction with an electronic invoice from Great Northern Bank. Alternatively, the electronic banking service may be designed to first display an HTML-based menu of available enclosures. The menu may have a brief description of the enclosure together with estimates of downloading time. Enclosures may be designed to include Internet links, sound, animation, and/or video.

Figure 16:
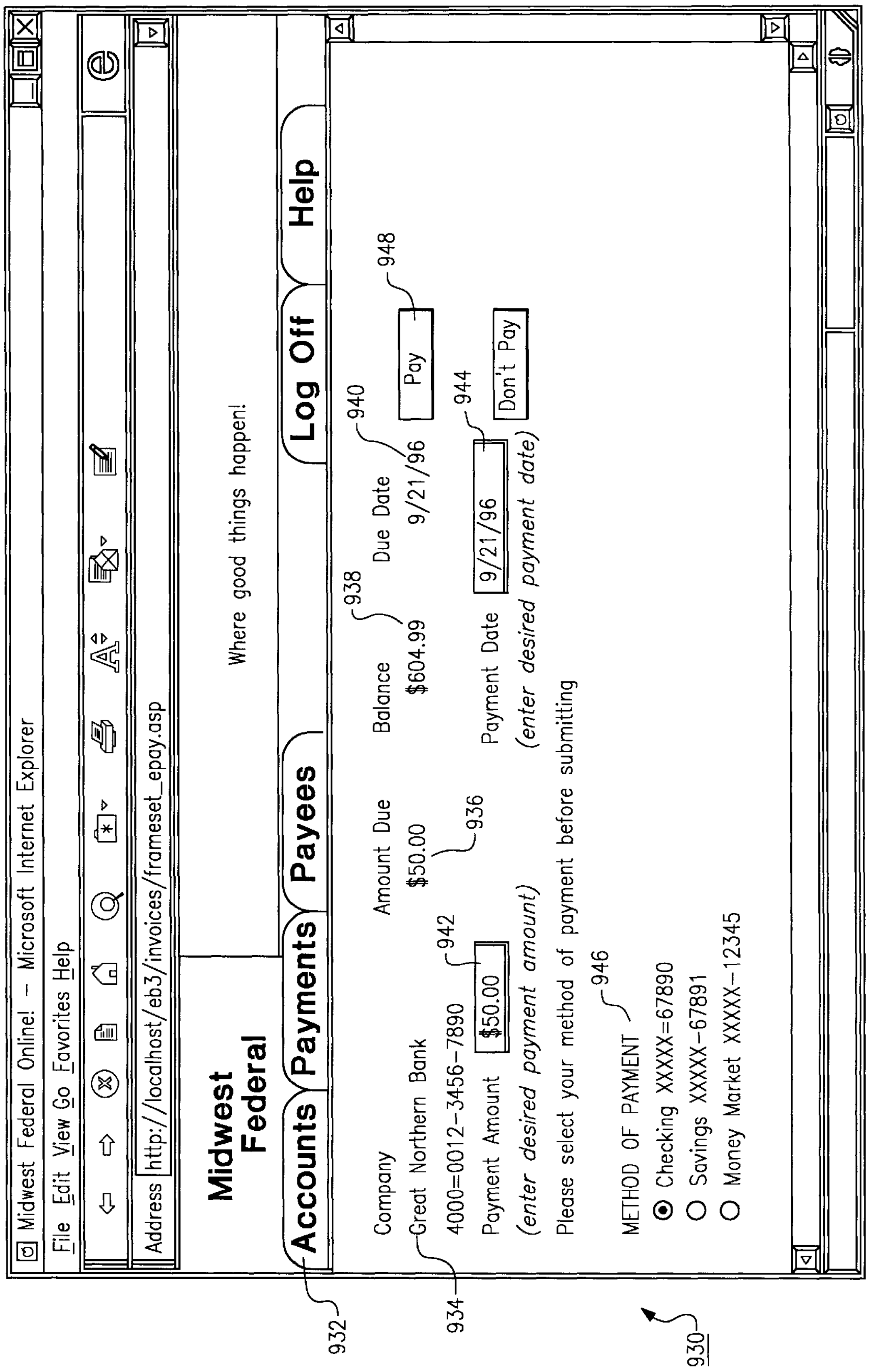
FIG. 16 is a sample make payment screen available from the Internet site.

FIG. 16 is a sample make payment screen 930 that is displayed when the customer clicks on the return button in band 884 from any of the previous three screens, or when the customer clicks on pay invoice button 878 of FIG. 12. Make payment screen 930 includes buttons 932 for viewing accounts, payments, payees, or for logging off or receiving help. Also included is biller name 934, an amount due 936, a running balance 938, and a due date 940. The customer selects a payment amount 942, a payment date 944, a method of payment 946 and finally clicks pay button 948 to submit the payment via an electronic bill payment system for delivery back to the biller. A confirmation screen would typically follow such a transaction. A confirmation screen includes an acknowledgment of payment, and a listing of the payment method, date of payment, amount of payment and a confirmation number. Advantageously, the electronic invoice delivered to the customer from the biller contains all necessary information to construct an electronic bill payment transaction. This electronic remittance coupon information ensures the accurate and economical processing of the payment at the biller's account receivable operation.

PREFERRED EMBODIMENT

Although the present invention may be embodied in many forms, the following specific embodiments have been found to produce desirable results. In terms of processing efficiency, three types of processing architecture are possible: on-site generation interface only; mail station interface only and a mix of the two. On-site generation places SGEN 224 and SORG 208 at the CSP and biller physical locations, respectively. Mail station interface places a remote mail station at the CSP and biller physical locations and enhances the capacity and functionality of switch 214 to both originate and generate statements. An optimum mix of both architectures produces the least cost in terms of processing efficiency. For very large CSPs and billers, it may be advantageous to use an on-site generation interface. For large CSPs, the economic crossover point is at about 50,000 statements per month. For a large biller, the economic crossover point is at about 1,500,000 transactions per month. Preferably, it would be desirable to develop an ESP system around the mail station interface architectural approach and then develop the on-site generation interface later as volumes build and economies of scale dictate a more efficient processing arrangement.

Although a variety of computer systems may be used to implement the ESP system, a desirable computer system is IBM-compatible, supports 32-bit APIs, is multi-tasking, is compatible with Microsoft Visual Basic, uses flexible, integrated cryptographic security file transfer capabilities, and has country specific security features. In one specific embodiment, Microsoft Windows NT operating on an Intel Pentium platform has produced desirable results. For a customer system, it is recommended to use a Windows/Intel PC with a 540×480 VGA display. Disk storage is recommended at 6MB for software and approximately 5MB per year's worth of stored invoice files (if the customer wishes to store invoices). Using a 28.8 k baud modem produces desirable results.

Preferably, ESP system 200 is able to interface with a wide variety of operating software environments. In one specific embodiment, the system interfaces with Ethernet or token ring networks, supports TCP/IP transport, is compatible with Windows NT 4.0, is compatible with the Open Financial Exchange framework (OFX), and transfers information via shared files. Although the ESP system is capable of using any file transfer mechanism (and any mail system), transport may be implemented using the Windows Messaging API, which supports a multitude of mail systems, including Exchange Server, CCMail, SMTP and X400 protocols in particular. Data files may be attached to Exchange mail messages and sent using the Exchange server.

A wide variety of security measures may be suitable for use within the present invention. By way of example, security measures that relate to encryption, integrity, authentication and key storage may be used. In one specific embodiment, a triple DES encryption technique is used, integrity and authentication are performed using SHA1 with RSA, and key storage is implemented using a technique based on private and public address books. An X500 protocol is also desirable for key storage. Security between a CSP and a consumer with Internet access preferably uses Secure Socket Layer 3.0 and 128 bit keys.

COMPUTER SYSTEM EMBODIMENT

Figure 17:
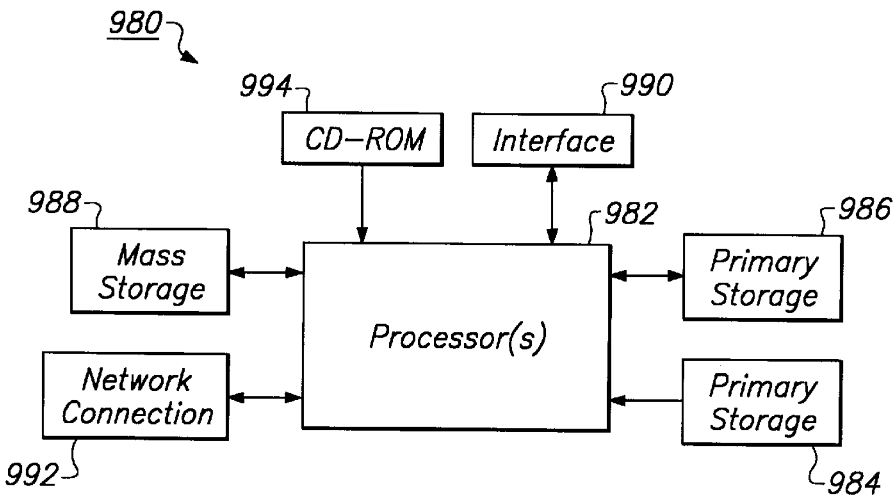
FIG. 17 is a block diagram of a typical computer system suitable for implementing an embodiment of the present invention.

FIG. 17 illustrates a computer system 980 in accordance with an embodiment of the present invention. Computer system 980 includes any number of processors 982 (also referred to as central processing units, or CPUs) that are coupled to storage devices including primary storage 986 (such as random access memory, or RAM) and primary storage 984 (such as a read only memory, or ROM). As is well known in the art, primary storage 984 acts to transfer data and instructions uni-directionally to the CPU and primary storage 986 is used typically to transfer data and instructions in a bi-directional manner. Both of these primary storage devices may include any suitable of the computer-readable media described below. A mass storage device 988 is also coupled bi-directionally to CPU 982 and provides additional data storage capacity and may also include any of the computer-readable media described below. Mass storage device 988 may be used to store programs, data and the like and is typically a secondary storage medium (such as a hard disk) that is slower than primary storage. It will be appreciated that the information retained within mass storage device 988, may, in appropriate cases, be incorporated in standard fashion as part of primary storage 986 as virtual memory. A specific mass storage device such as a CD-ROM 994 passes data uni-directionally to the CPU.

CPU 982 is also coupled to an interface 990 that includes one or more input/output devices such as such as video monitors, track balls, mice, keyboards, microphones, touch-sensitive displays, transducer card readers, magnetic or paper tape readers, tablets, styluses, voice or handwriting recognizers, biometrics readers, or other computers. CPU 982 optionally may be coupled to another computer or telecommunications network using a network connection as shown generally at 992. With such a network connection, it is contemplated that the CPU might receive information from the network, or might output information to the network in the course of performing the above-described method steps.

In addition, embodiments of the present invention further relate to computer storage products with a computer readable medium that have program code thereon for performing various computer-implemented operations. The media and program code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For instance, the invention may be integrated with any suitable electronic bill payment system. The functionality of the coordinating entity, including the functionality of the TAWS, the SORG, the switch, the SGEN, the TVAL, etc., may be distributed throughout the ESP environment, and may be implemented on separate computers or the functionality may be combined on fewer computers. In particular, the functionality of the SORG, the switch and the SGEN may be implemented centrally on a single computer, or may be implemented on separate computers. Furthermore, both the SORG and SGEN may be located remotely at a biller and CSP, respectively. Also, the central site switch may be implemented using various computers performing different aspects of the switch functionality. For example, one computer may assist with ESP system functionality, while another assists with an electronic bill payment system. In addition, any format of data from a biller can be used, and the invention is capable of producing statements in a variety of data formats, including PDF, EDI 810, HTML, etc. Furthermore, statements, invoices, account updates, bills, or information of any kind may be transmitted using the present invention from a biller to one of its customers. For presentation of the information to a customer, any of a variety of media may be used to transmit and display the information from a CSP to the customer. Therefore, the described embodiments should be taken as illustrative and not restrictive, and the invention should not be limited to the details given herein but should be defined by the following claims and their full scope of equivalents.

TABLE A

| Summary of ADV Messages | | | | | |
|---|---|---|---|---|---|
| ADV Type | Originator | Recipient | Response | Description | Comment |
| | | | GSA ADV Messages | | |
| SGN | SGEN | CSP | none | Invoice Generated - Main Notification | Main Invoice Descriptor file |
| SGI | SGEN | CSP | none | Invoice Generated - Invoice Data | Invoice-Specific fielded data |
| SGF | SGEN | CSP | none | Invoice Generated - File Pointer | File Pointer records |
| ADV Type | Originator | Recipient | Response | Brief Description | Comment |
| | | | Consumer ADV Messages | | |
| | | | Subscriptions Available | | |
| TLG | TAWS | Switch | SAC | Template Logo Files. Used only by TAWS to submit or change the logos associated with a yellow page listing. | Logo files are sent to SGENs as attachments to TPL-Add/Change ADVs with a null version number |
| SBL | CSP | SGEN | SBA (many) | Subscriptions Available List Request | Request for "Yellow Pages" Allows for date and locale filtering. |
| SBA | SGEN | CSP | none | Subscription Available Response | One per template. Bundled in a text file attached to a HDR ADV. |
| | | | Subscription Processing | | |
| SBP | CSP to SGEN to SORG to BSP or vice versa. | CSP to SGEN to SORG to BSP or vice versa. | SBP or NAK | Subscription Processing; uses Action field to accomplish multiple actions | Add, change, replace, add sibling, or terminate subscriptions with confirmation |
| | | | Invoice Management | | |
| SDN | CSP | SGEN and BSP (opt) | none | Invoice PDF File Download Notification B | SGEN removes CSP-specific key data from BSP's version |
| STX | BSP | SGEN | SDX/HDR | Invoices Not Downloaded List Request | |
| SDX | SGEN | BSP | none | Invoice not downloaded by Expiration Date B | SDXs likely grouped and sent as text file attached to HDR ADV |
| | | | Invoice Delivery | | |
| SGR | CSP | SGEN | SGN | Invoice Generation Requests | Primarily to request historical Invoices |
| SGN | SGEN | CSP | none | Invoice Generated - Main Notification | Main Invoice Descriptor file |
| SGI | SGEN | CSP | none | Invoice Generated - Invoice Data | Invoice-Specific fielded data |
| SGF | SGEN | CSP | none | Invoice Generated - File Pointer | File Pointer records |
| SGA | SGEN | CSP | none | Invoice Generated - Advisory Data | Advisory-Specific fielded data |
| SGS | SGEN | CSP | none | Invoice Generated - Account Summary | Account Summary - Specific fielded data |
| | | | Station Control | | |
| CTL | Switch to all Stations | All Stations from Switch | SAC/NAK | Used for Station Control, special handling by ADV Loader; does not have its own handler process | Actions are Start, Stop, Init, EDR, and EDRStop. Used for End of Day and Start of Day processing and full initialization of UBF, ESP Address Books |
| | | | Template ADV | | |
| TPN | TAWS | Switch | TPA | New template ID or Version Request | |
| TPA | Switch | TAWS | none | New template ID or Version Assigned | |

TABLE A-continued

| Summary of ADV Messages | | | | | |
|---|---|---|---|---|---|
| TPL | TAWS & Switch | Switch, TVAL, SGEN and SORG | TVA to TAWS, but none if in response to TRE | Template Action ADV Used by TAWS to submit templates for evaluation and by Switch to send templates to SGEN and SORG | Add, change, or delete templates or versions. When sent to an SGEN with no version number, used as a cover for attached logo files |
| TRE | SGEN or SORG or TVAL | Switch | TPL or TCN | Template Request from SORG or SGEN | |
| TVR | TAWS, Switch | Switch, TVAL | TVN | Template Validation Request | |
| TVN | TVAL | | none | Template Validation Results | |
| Miscellaneous ADVs | | | | | |
| HDR | All stations | All stations | none | Used to send a collection of ADVs in response to a single ADV request | SBL draws many SBAs; STX draws many SDXs |
| OPS | All stations | An operator mailbox | none | Operator Message B | Processed by a generic GUI handler |
| SAC | All stations | All stations | None | Simple Acknowledgment | Like all ADVs, may include attachments |
| NAK | All stations | All stations | None | Simple Negative Acknowledgment B From anywhere to anywhere else. | The receiver of a NAK often generates an OPS in response |
| EXX | All stations except Switch | Switch | SAC | Template error. | Switch broadcasts the error report as needed. |

We claim:

1. A method for generating an electronic statement for delivery to a customer of a biller, said method comprising:

receiving customer statement data including an associated customer identifier, a template identifier selected by said biller, and periodic information desired by said biller to be delivered to said customer;

selecting a template from a plurality of templates based on said template identifier, whereby said customer statement data identifies a template for use;

receiving said template associated with said customer statement date, said template including static information desired by said biller to be delivered to said customer;

delivering said customer statement data and said template to a consumer service provider who has a previously established service relationship with said customer;

combining said customer statement data and said template at said consumer service provider to generate an electronic statement for said customer, said electronic statement including said periodic information and said static information; and providing said electronic statement from said consumer service provider to said customer via a medium utilizing said associated customer identifier, said medium being previous established along with the previously established service relationship, wherein customer statement data also consists of mandatory data and optional data and only mandatory data is transmitted to said consumer service provider when the amount of template data and customer statement data is greater than a certain threshold amount whereby the transmission of only mandatory data minimizes a time required for a customer to download said electronic statement.

2. A method as recited in claim 1 wherein said template includes instructions for formatting said customer statement data, said method further comprising:

formatting said customer statement data using said instructions included with said template to produce formatted customer statement data in a form expected by said template for subsequent generation of an electronic statement.

3. A method as recited in claim 1 wherein said generated electronic statement provided to said customer includes an invoice from said biller, remittance data for said biller and a biller identification, said method further comprising:

receiving electronically an invoice pay instruction from said customer including said remittance data; and routing said remittance data to said biller based upon said biller identification, whereby said customer may electronically pay said invoice included in said electronic statement.

4. A method as recited in claim 1 wherein said combining is performed by:

executing a generation program included with said template.

5. A method as recited in claim 1 wherein said selecting a template includes:

determining whether said template identified by said template identifier is present locally; and wherein when it is determined that said template is not present locally, said method includes requesting said template identified by said template identifier from a template library located within a central computer, whereby said template library serves as a central repository of templates for at least said biller.

6. A method as recited in claim 1 further comprising:

receiving customer statement data for a plurality of customers originating from a plurality of billers, said customer statement data being routed to one of a plurality of consumer service providers using a consumer service provider identifier associated with each customer statement data;

generating electronic statements for said customers; and providing said electronic statements to said customers utilizing said associated customer identifiers, whereby said electronic statements for said plurality of billers are delivered to said customers.

7. A method as recited in claim 1 wherein said combining includes:

said identifying an enclosure from a plurality of enclosures within said static information of said template corresponding to said customer identifier; and producing said enclosure within said generated electronic statement.

8. A method as recited in claim 1 wherein said consumer service provider is a consumer bank.

9. A method as recited in claim 8 wherein said previously established service relationship is a home banking service.

10. A method as recited in claim 1 further comprising:

comparing and verifying that said customer statement data and said template can be properly combined, said comparing and verifying being performed by said biller.

11. A generation computer for generating an electronic statement for delivery to a customer of a biller, said generation computer comprising:

customer statement data embodied in a computer-readable medium including an associated customer identifier, a template identifier selected by said biller, and periodic information desired by said biller to be delivered to said customer;

a template embodied in a computer-readable medium and being associated with said customer statement data, said template including static information desired by said biller to be delivered to said customer, said template selected from a plurality of templates based on said template identifier;

a transmitting software program for delivering said customer statement data and said template to a consumer service provider who has a previously established service relationship with said customer;

a combining software program for combining said customer statement data and said template to generate an electronic statement for said customer, wherein customer statement data also consists of mandatory data and optional data and only mandatory data is transmitted to said consumer service provider when the amount of template data and customer statement data is greater than a certain threshold amount whereby a transmission of only mandatory data minimizes a time required for a customer to download said electronic statement, said electronic statement including said periodic information and said static information, whereby said electronic statement is delivered from said consumer service provider to said customer via a medium utilizing said associated customer identifier, said medium being previous established along with the previously established service relationship.

12. A generation computer as recited in claim 11 wherein said customer statement data is from a customer record of said biller, and said template includes:

a template database indicating a subset of data fields from said customer record that represent a portion of said customer record that said biller desires to deliver to said customer in said electronic statement;

placement instructions indicating data locations for said portion of said customer record within said electronic statement; and a generation program arranged to generate said electronic statement utilizing said template database, said placement instructions and said portion of said customer record, whereby said template is subsequently combined with said portion of said customer record to generate said electronic statement for said customer.

13. A generation computer as recited in claim 12 wherein said template further comprises:

parsing instructions for formatting said portion of said customer record into a format compatible with said template database, wherein said generation program is further arranged to utilize said formatted portion of said customer record to generate said electronic statement.

14. A generation computer as recited in claim 12, wherein said template further comprises:

a graphical resource for inclusion in said electronic statement, wherein said generation program is further arranged to utilize said graphical resource to generate said electronic statement.

15. A generation computer as recited in claim 12 wherein said template further comprises:

an enclosure; and a condition for including said enclosure in said electronic statement, wherein said generation program is further arranged to utilize said condition to generate said electronic statement.

16. A generation computer as recited in claim 12 wherein said template further comprises:

remittance data fields identifying remittance data to be included in said electronic statement, wherein said generation program is further arranged to utilize said remittance data fields to generate said electronic statement, whereby said customer may pay an invoice included in said electronic statement using said remittance data in said remittance data fields.

17. A computer-readable medium comprising computer code for generating an electronic statement for delivery to a customer of a biller, said computer code for said computer-readable medium effecting the following:

receiving customer statement data including an associated customer identifier, a template identifier selected by said biller, and periodic information desired by said biller to be delivered to said customer;

selecting a template from a plurality of templates based on said template identifier, whereby said customer statement data identifies a template for use;

receiving said template associated with said customer statement data, said template including static information desired by said biller to be delivered to said customer;

delivering said customer statement data and said template to a consumer service provider who has a previously established service relationship with said customer;

combining said customer statement data and said template at the consumer service provider to generate an electronic statement for said customer, said electronic statement including said periodic information and said static information; and providing said electronic statement from said consumer service provider to said customer via a medium utilizing said associated customer identifier, said medium being previous established along with the previously established service relationship, wherein customer statement data also consists of mandatory data and optional data and only mandatory data is transmitted to said consumer service provider when the amount of template data and customer statement data is greater than a certain threshold amount whereby a transmission of only mandatory data minimizes a time required for a customer to download said electronic statement.

18. A computer-readable medium as recited in claim 17 wherein said template includes instructions for formatting said customer statement data, including computer code for:

formatting said customer statement data using said instructions included with said template to produce formatted customer statement data in a form expected by said template for subsequent generation of an electronic statement.

19. A computer-readable medium as recited in claim 17 including computer code for:

executing a generation program included with said template.

20. A computer-readable medium as recited in claim 17 including computer code for:

determining whether said template identified by said template identifier is present locally; and wherein when it is determined that said template is not present locally, requesting said template identified by said template identifier from a template library located within a central computer, whereby said template library serves as a central repository of templates for at least said biller.

21. A computer-readable medium as recited in claim 17 including computer code for:

receiving customer statement data for a plurality of customers originating from a plurality of billers, said customer statement data being routed using a consumer service provider identifier associated with each customer statement data;

generating electronic statements for said customers; and providing said electronic statements to said customers utilizing said associated customer identifiers, whereby said electronic statements for said plurality of billers are delivered to said customers.

* * * * *